United States Patent
Baruco et al.

(10) Patent No.: US 10,443,292 B2
(45) Date of Patent: Oct. 15, 2019

(54) NON-CONTACT OBSTACLE DETECTION SYSTEM FOR MOTOR VEHICLES

(71) Applicant: Magna Closures Inc., Newmarket (CA)

(72) Inventors: Samuel R. Baruco, Aurora (CA); Gabriele Wayne Sabatini, Keswick (CA); J. R. Scott Mitchell, Newmarket (CA); Kurt M. Schatz, Uxbridge (CA)

(73) Assignee: Magna Closures, Inc., Newmarket (CA)

( * ) Notice: Subject to any disclaimer, the term of this patent is extended or adjusted under 35 U.S.C. 154(b) by 73 days.

(21) Appl. No.: 15/493,285

(22) Filed: Apr. 21, 2017

(65) Prior Publication Data
US 2017/0306684 A1    Oct. 26, 2017

Related U.S. Application Data

(60) Provisional application No. 62/327,317, filed on Apr. 25, 2016, provisional application No. 62/460,152, filed on Feb. 17, 2017.

(51) Int. Cl.
*E05F 15/73* (2015.01)
*B60J 5/10* (2006.01)
(Continued)

(52) U.S. Cl.
CPC ............... *E05F 15/73* (2015.01); *B60J 5/101* (2013.01); *B60R 1/06* (2013.01); *B60R 1/12* (2013.01);
(Continued)

(58) Field of Classification Search
CPC ..... E05F 15/43; E05F 15/73; E05F 2015/432; E05F 2015/433; E05F 2015/763
See application file for complete search history.

(56) References Cited

U.S. PATENT DOCUMENTS

| 4,458,446 A | 7/1984 | Mochida et al. |
| 6,205,710 B1 | 3/2001 | Busse |

(Continued)

FOREIGN PATENT DOCUMENTS

| DE | 19537619 A1 | 4/1997 |
| DE | 19836310 A1 | 3/2000 |

(Continued)

*Primary Examiner* — Abby Y Lin
*Assistant Examiner* — Donald J Wallace
(74) *Attorney, Agent, or Firm* — Dickinson Wright PLLC

(57) ABSTRACT

A non-contact obstacle detection (NCOD) system for a motor vehicle and a method of operating the non-contact obstacle detection system are disclosed. The NCOD system includes a main electronic control unit adapted to connect to a power source. At least one non-contact obstacle sensor is coupled to the main electronic control unit for detecting obstacles near a closure member of the vehicle. The control unit is configured to detect an obstacle and cease movement of the closure member in response to the obstacle being detected. Additionally, the control unit is configured to release a latch and apply power to a motor in response to the obstacle not being detected. The control unit is also configured to determine whether the closure member is in a full open position, and continue to apply power to a motor coupled to the closure member if the closure member is not in the full open position.

24 Claims, 23 Drawing Sheets

(51) Int. Cl.
  *B60R 1/06* (2006.01)
  *B60R 1/12* (2006.01)
  *E05F 15/43* (2015.01)
  *E05F 15/622* (2015.01)

(52) U.S. Cl.
  CPC ............ *E05F 15/43* (2015.01); *E05F 15/622* (2015.01); *B60R 2001/1223* (2013.01); *E05F 2015/433* (2015.01); *E05F 2015/434* (2015.01); *E05F 2015/763* (2015.01); *E05Y 2400/32* (2013.01); *E05Y 2400/36* (2013.01); *E05Y 2900/531* (2013.01); *E05Y 2900/546* (2013.01)

(56) References Cited

U.S. PATENT DOCUMENTS

| | | |
|---|---|---|
| 6,864,783 B2 | 3/2005 | Rao et al. |
| 7,026,930 B2 | 4/2006 | Appel et al. |
| 7,175,227 B2 | 2/2007 | Menard |
| 7,193,509 B2 | 3/2007 | Bartels et al. |
| 9,068,390 B2 | 6/2015 | Ihlenburg et al. |
| 9,174,517 B2 | 11/2015 | Scheuring et al. |
| 9,777,528 B2 | 10/2017 | Elie et al. |
| 2003/0197601 A1* | 10/2003 | Takagi ............... B60Q 9/008 340/435 |
| 2004/0119587 A1* | 6/2004 | Davenport ............ B61L 5/189 340/538 |
| 2004/0198106 A1* | 10/2004 | Tsumiyama ........ B63H 21/213 440/1 |
| 2005/0085972 A1 | 4/2005 | Martinez |
| 2005/0174077 A1* | 8/2005 | Haag ................... G01S 13/04 318/280 |
| 2006/0033612 A1 | 2/2006 | Santa |
| 2007/0296242 A1* | 12/2007 | Frommer .............. E05F 15/43 296/146.4 |
| 2008/0089177 A1* | 4/2008 | Kojima ................. G01S 7/521 367/93 |
| 2009/0000196 A1* | 1/2009 | Kollar .................. E05F 15/43 49/28 |
| 2009/0051192 A1* | 2/2009 | Ewing ................. E05F 15/622 296/146.2 |
| 2009/0139142 A1* | 6/2009 | Li ......................... E05F 15/73 49/26 |
| 2010/0082206 A1* | 4/2010 | Kollar ................... E05F 15/43 701/49 |
| 2012/0313384 A1 | 12/2012 | Cumbo et al. |
| 2013/0169408 A1* | 7/2013 | Endo .................. B60R 25/2045 340/5.6 |
| 2013/0234828 A1* | 9/2013 | Holzberg ........... B60R 25/2054 340/5.72 |
| 2014/0207344 A1* | 7/2014 | Ihlenburg .............. E05F 15/73 701/49 |
| 2015/0006778 A1* | 1/2015 | Leo .................... G06F 13/4027 710/306 |
| 2015/0294267 A1* | 10/2015 | Bode ................. G06Q 10/0875 705/26.81 |
| 2015/0330116 A1 | 11/2015 | Dente |
| 2015/0331030 A1* | 11/2015 | Conner ................. E05B 81/62 324/503 |
| 2015/0376929 A1 | 12/2015 | Scheuring et al. |
| 2016/0010379 A1* | 1/2016 | Sauerwein ............. E05F 5/00 701/49 |
| 2016/0314362 A1 | 10/2016 | Elie et al. |
| 2017/0044816 A1* | 2/2017 | Salter .................... E05F 15/73 |
| 2017/0247933 A1* | 8/2017 | Elie ....................... E05F 15/40 |
| 2017/0321468 A1* | 11/2017 | Frapsauce ............. E05F 15/73 |

FOREIGN PATENT DOCUMENTS

| | | |
|---|---|---|
| DE | 10117516 A1 | 10/2002 |
| DE | 102004020426 A1 | 11/2005 |
| EP | 1562054 A2 | 8/2005 |
| EP | 2145289 B1 | 10/2012 |
| EP | 1407106 B1 | 5/2016 |
| WO | WO2005008007 A1 | 1/2005 |
| WO | WO2005044639 A1 | 5/2005 |
| WO | WO2014198803 A1 | 12/2014 |
| WO | WO2014199235 A2 | 12/2014 |
| WO | WO2016173579 A1 | 11/2016 |

\* cited by examiner

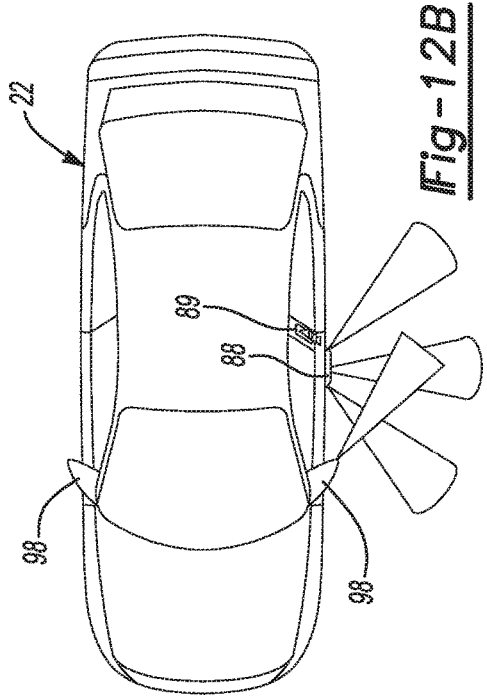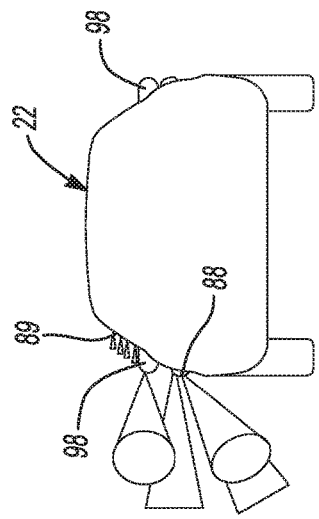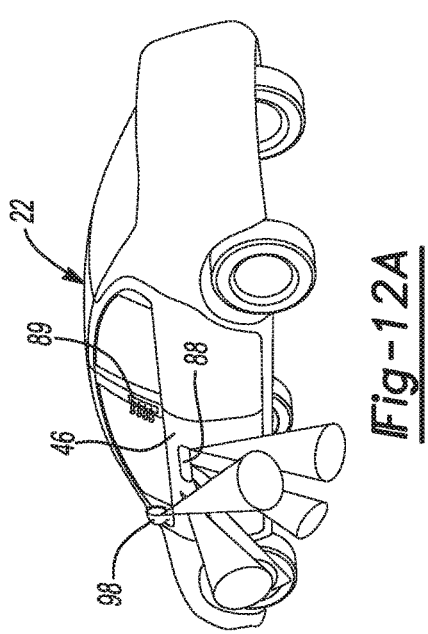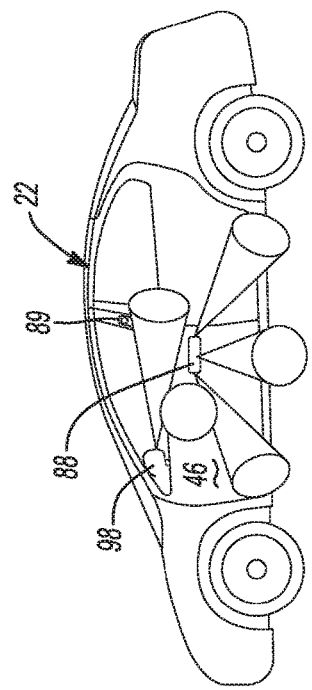
Fig-12A
Fig-12B
Fig-12C
Fig-12D

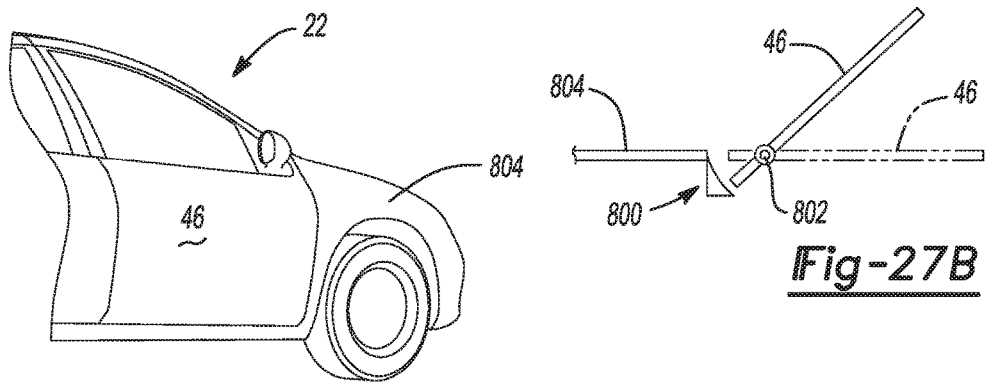
*Fig-27A*  *Fig-27B*
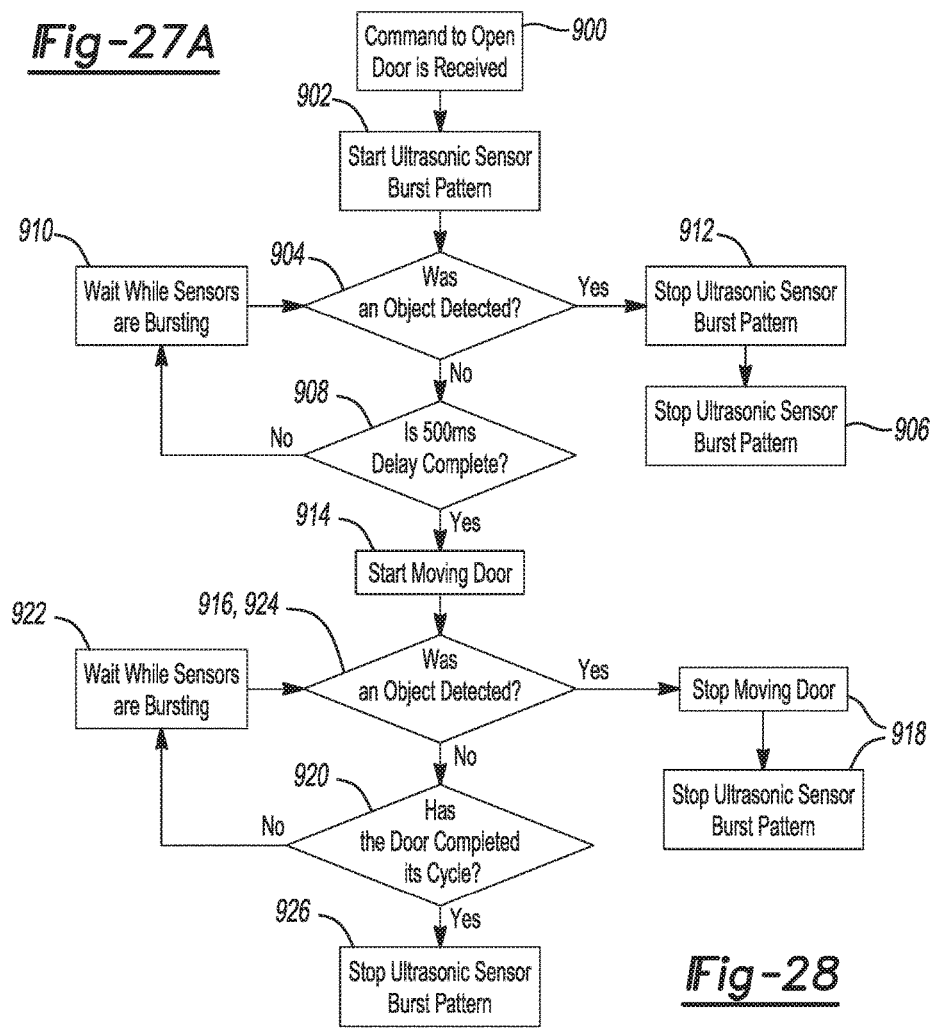
*Fig-28*

NON-CONTACT OBSTACLE DETECTION SYSTEM FOR MOTOR VEHICLES

CROSS-REFERENCE TO RELATED APPLICATIONS

This application claims the benefit of U.S. Provisional Application No. 62/327,317 filed Apr. 25, 2016 and U.S. Provisional Application No. 62/460,152 filed Feb. 17, 2017. The entire disclosures of the above applications are incorporated herein by reference.

FIELD

The present disclosure relates generally to a non-contact obstacle detection system for a motor vehicle and method of operating the non-contact obstacle detection system.

BACKGROUND

This section provides background information related to the present disclosure which is not necessarily prior art.

Motor vehicles are increasingly being equipped with sensors that detect the environment and terrain surrounding the motor vehicle. For example, some vehicles include sensor systems that provide images of the terrain and/or other objects in the vicinity of the vehicle. Sensing systems utilizing radar have also been used to detect the presence and position of objects near the motor vehicle while the vehicle is moving. The signals and data generated by these sensor systems can be used by other systems of the motor vehicle to provide safety features such as vehicle control, collision avoidance, and parking assistance. Such sensing systems are generally used to assist the driver while he or she is driving the motor vehicle and/or to intervene in controlling the vehicle.

Additionally, closure members for vehicles (e.g. doors, lift gates, etc.) are increasingly provided with powered actuation mechanisms capable of opening and/or closing the closure members. Typically, powered actuation systems include a power-operated device such as, for example, an electric motor and a rotary-to-linear conversion device that are operable for converting the rotary output of the electric motor into translational movement of an extensible member. In most arrangements, the electric motor and the conversion device are mounted to the closure member and the distal end of the extensible member is fixedly secured to the vehicle body. One example of a such as powered actuation system is shown in commonly-owned U.S. Pat. No. 9,174,517 which discloses a power swing door actuator having a rotary-to-linear conversion device configured to include an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions. Such power actuated operation can lead to issues with the closure members unintentionally striking surrounding objects or obstacles. For example, an object near the closure member may obstruct the opening or closing of the closure member and/or the closure member may be damaged if opened under power and strikes the obstacle. However, known sensing system or obstacle detection systems do not properly address potential situations involving obstacles.

Thus, there is an increasing need for an obstacle detection system that prevents the closure member from colliding with nearby objects primarily when the vehicle is stationary. Furthermore, other desirable features and characteristics of the present invention will become apparent from the subsequent detailed description and the appended claims, taken in conjunction with the accompanying drawings and the foregoing technical field and background.

SUMMARY

This section provides a general summary of the present disclosure and is not intended to be interpreted as a comprehensive disclosure of its full scope or all of its features, aspects and objectives.

It is an aspect of the present disclosure to provide a non-contact obstacle detection system for a motor vehicle. The non-contact obstacle detection system includes a main electronic control unit having a plurality of input-output terminals and adapted to connect to a power source. At least one non-contact obstacle sensor is coupled to the plurality of input-output terminals of the main electronic control unit for detecting obstacles near a closure member of the vehicle. A power actuator is coupled to the closure member and to the plurality of input-output terminals of the main electronic control unit for moving the closure member. The main electronic control unit configured to move the closure member using the power actuator and detect an obstacle using said at least one non-contact obstacle sensor. The main electronic control unit is additionally configured to cease movement of the closure member in response to the obstacle being detected.

It is another aspect of the present disclosure to provide a method of operating a non-contact obstacle detection system for a motor vehicle. The method includes the step of determining whether a closure member is in an open position in response to detecting a command signal using a main electronic control unit. The next step of the method is commanding the closure member to move from a full closed position to a full open position in response to a determination that the closure member is not in the open position. The method can proceed by determining whether an obstacle is detected using at least one sensor and then continue to close the closure member in response to the obstacle not being detected. The next step of the method is determining whether the closure member is in the open position. The method can also return to the step of determining if an obstacle is detected using at least one sensor in response to the closure member being in the open position. The method concludes by stopping motion of the closure member in response to the closure member not being in the open position.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

Figure 1:
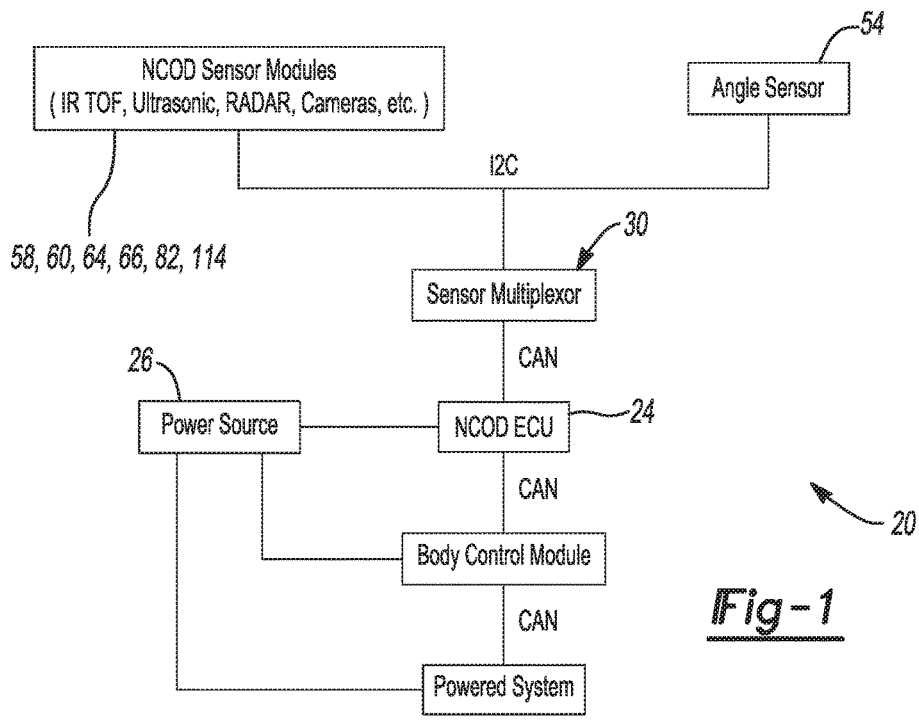
FIGS. 1 and 2 are block diagrams illustrating a non-contact obstacle detection system for a motor vehicle according to aspects of the disclosure.
Figure 2:
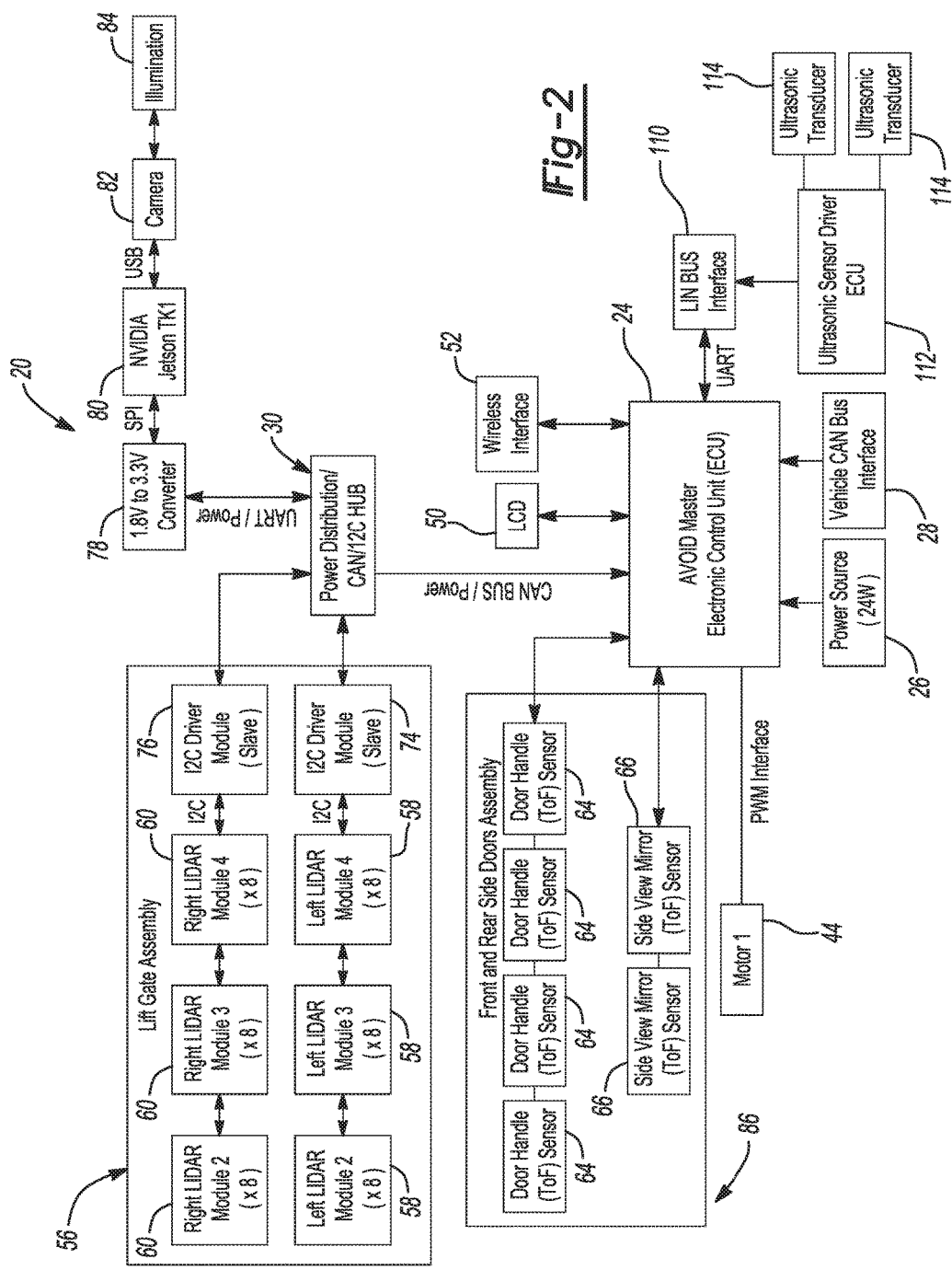
Figure 4:
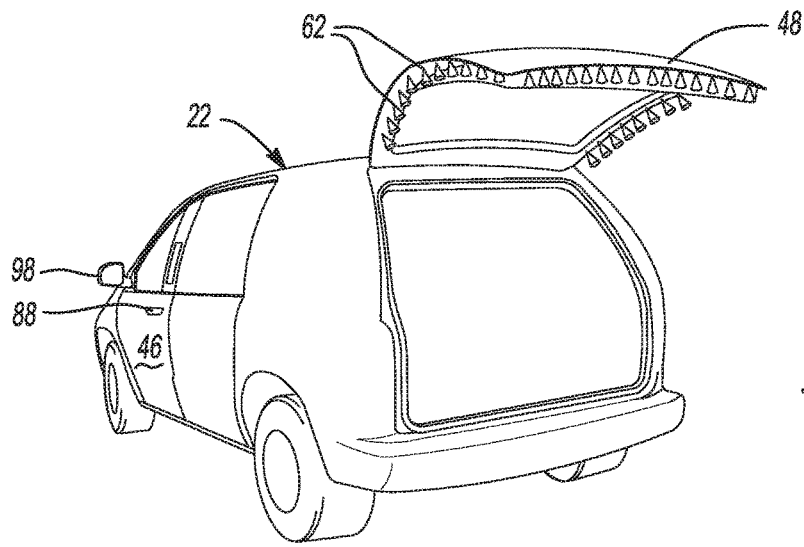
Figure 5A:
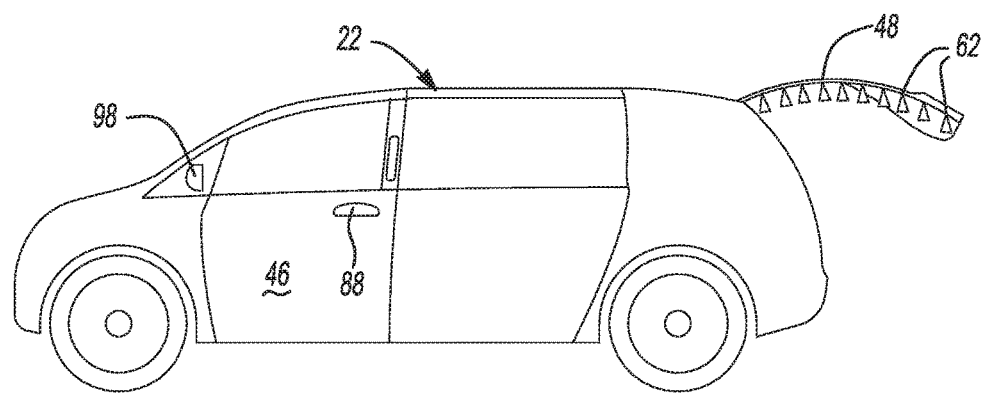
Figure 5B:
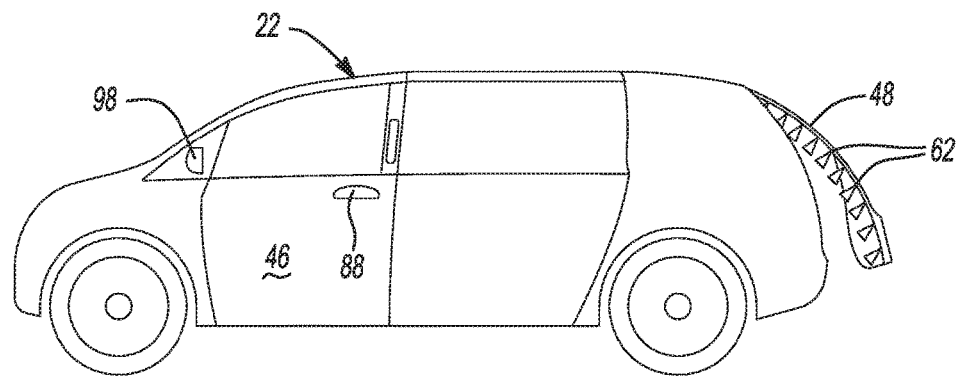
Figure 6A:
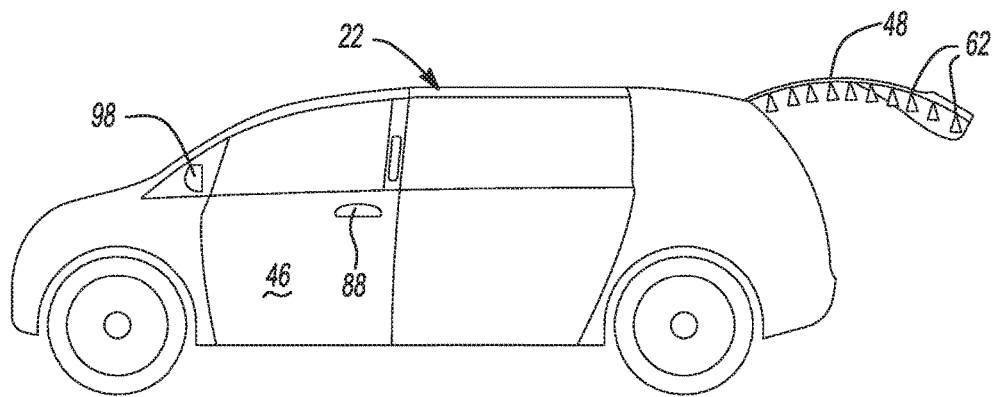
Figure 6B:
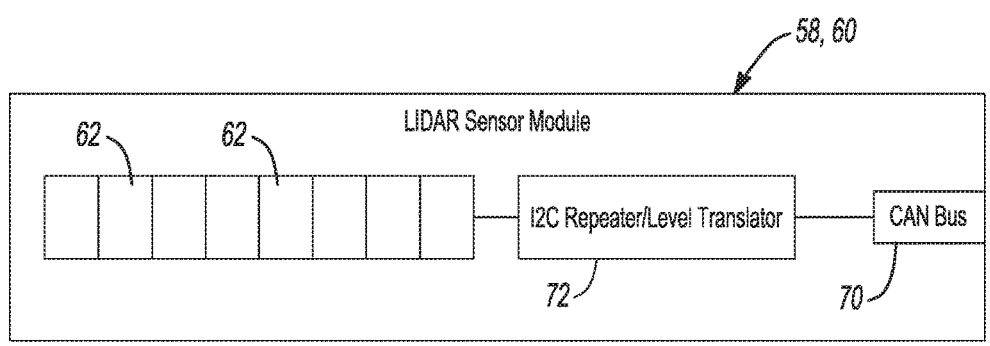
Figure 7A:
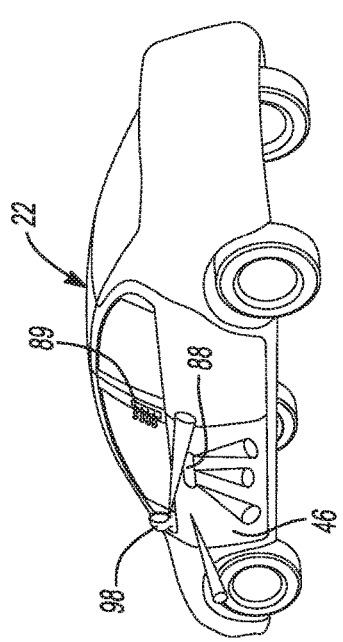
Figure 7B:
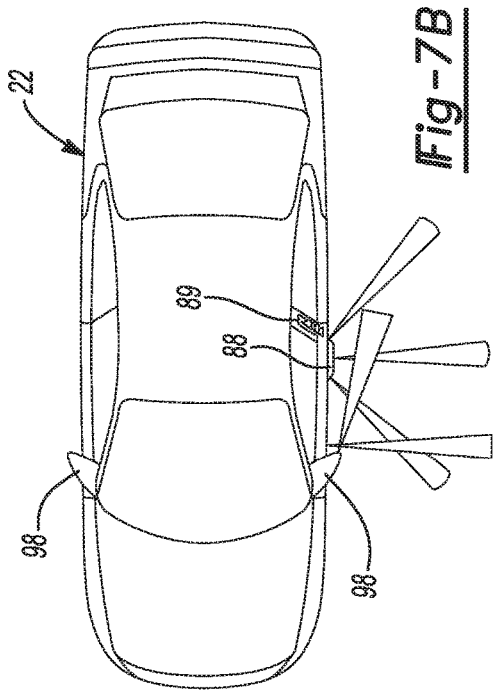
Figure 7C:
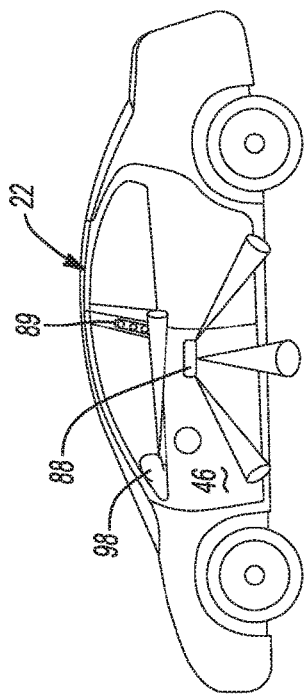
Figure 7D:
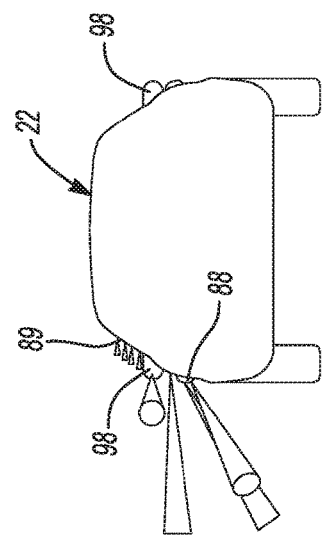
Figure 8A:
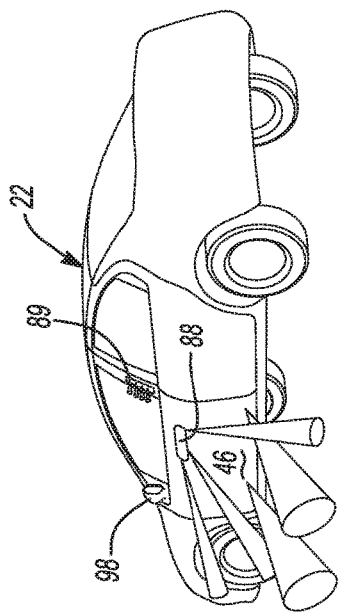
Figure 8B:
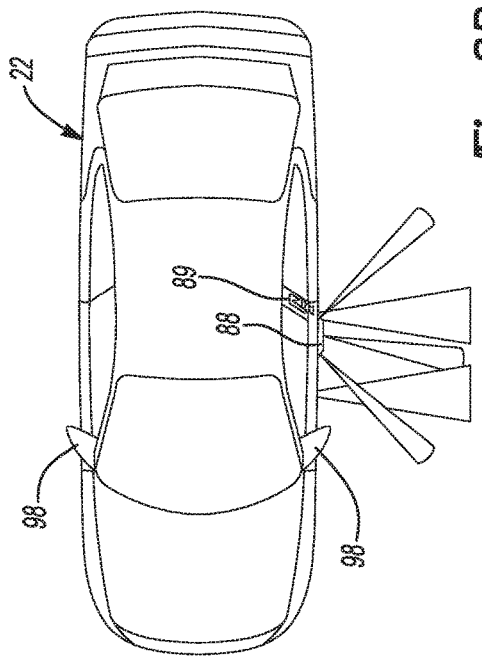
Figure 8C:
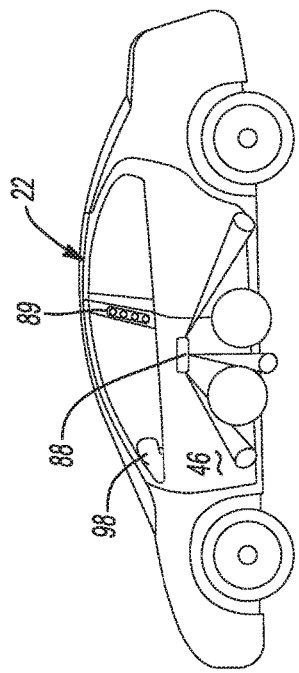
Figure 8D:
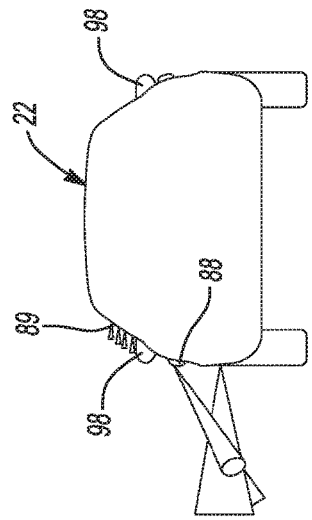
Figure 9B:
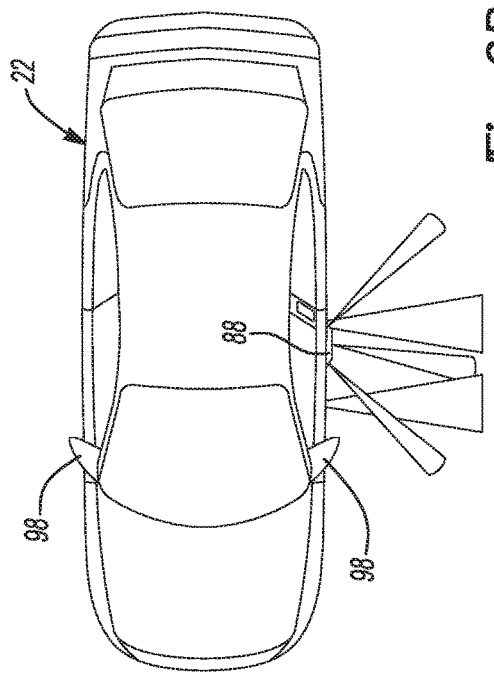
Figure 9D:
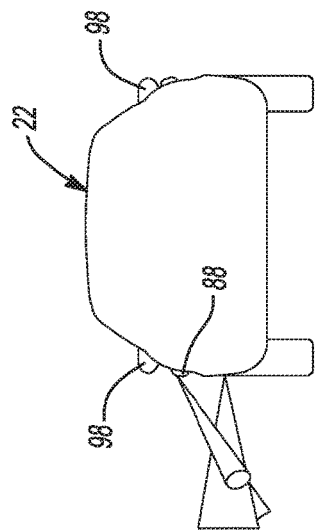
Figure 9A:
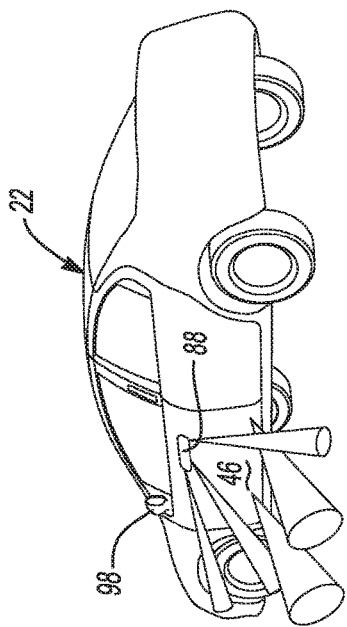
Figure 9C:
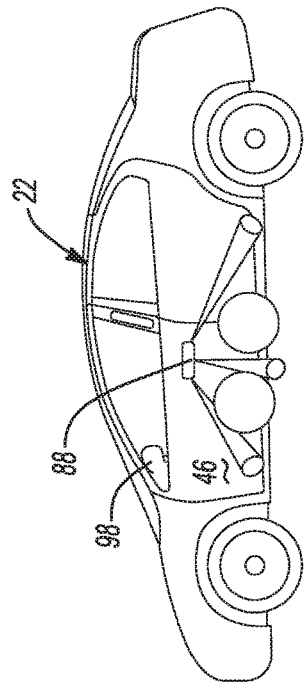
Figure 10B:
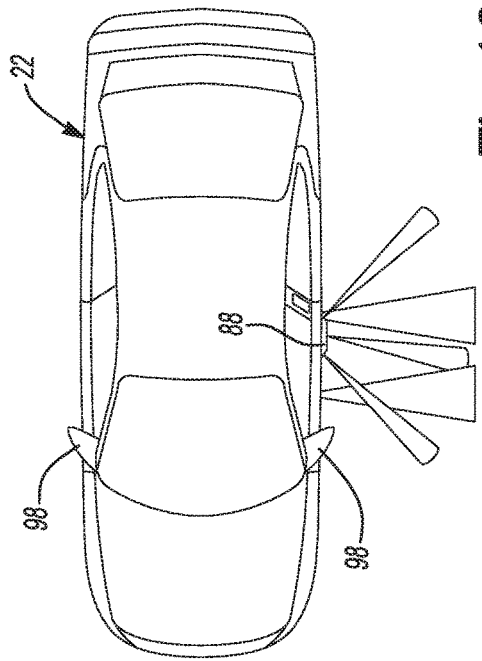
Figure 10D:
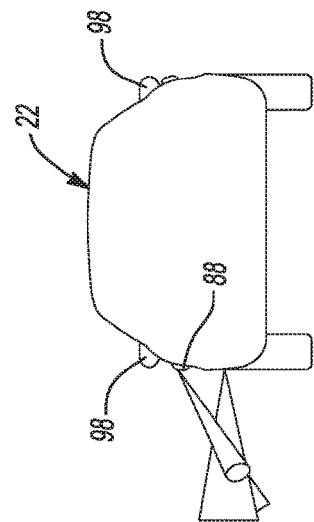
Figure 10A:
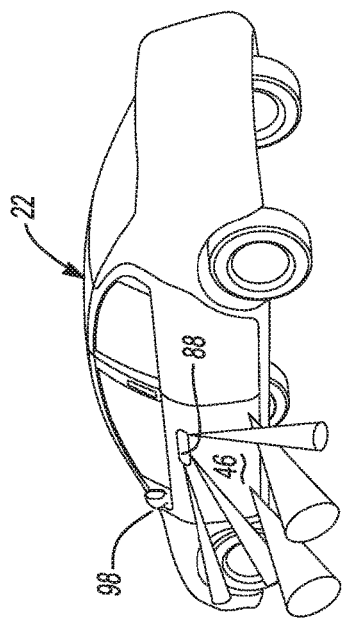
Figure 10C:
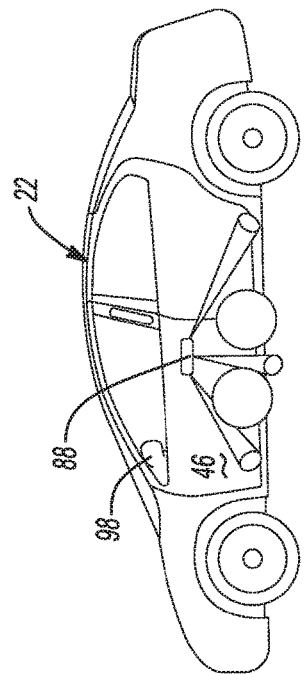
Figure 11A:
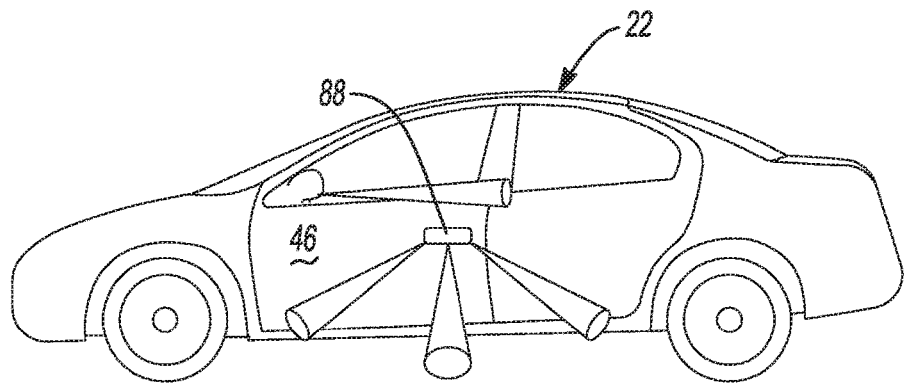
Figure 11B:
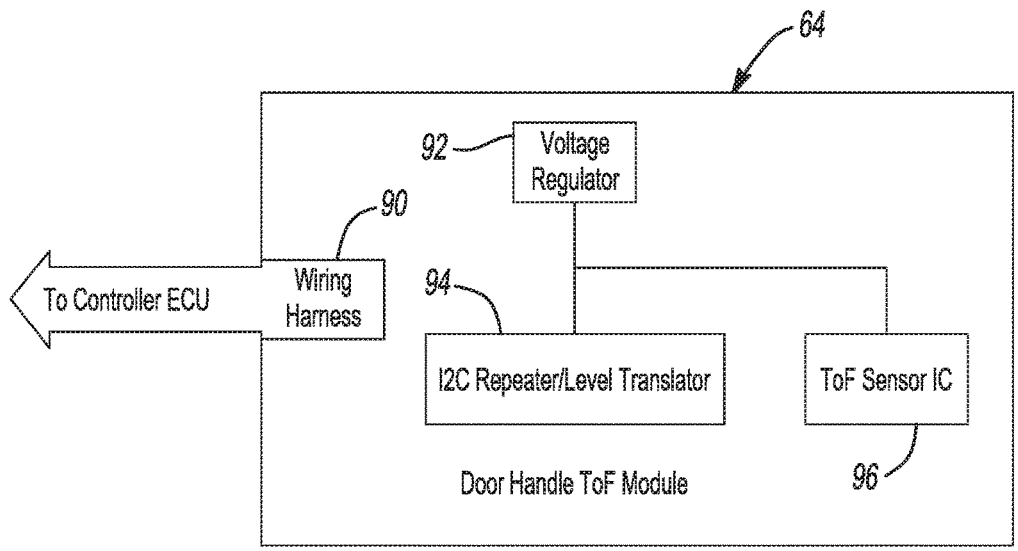
Figure 13B:
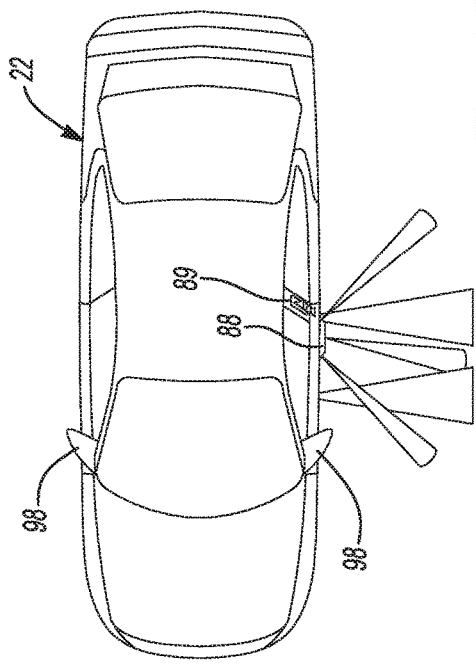
Figure 13D:
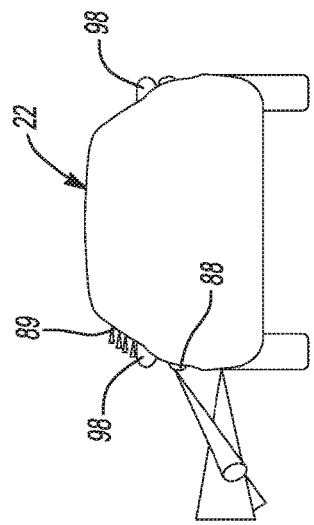
Figure 13A:
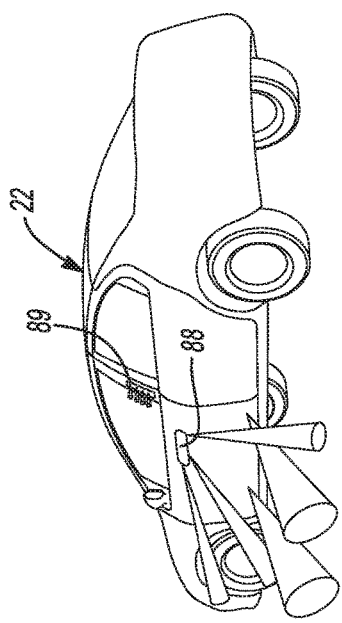
Figure 13C:
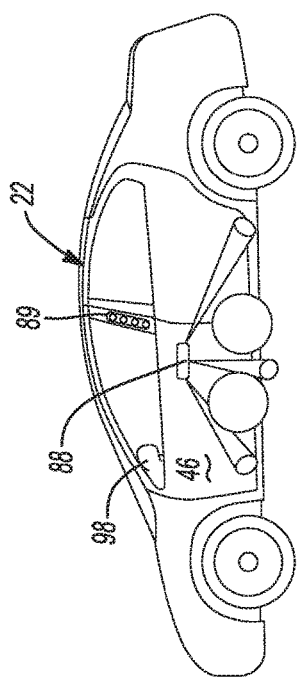
Figure 14A:
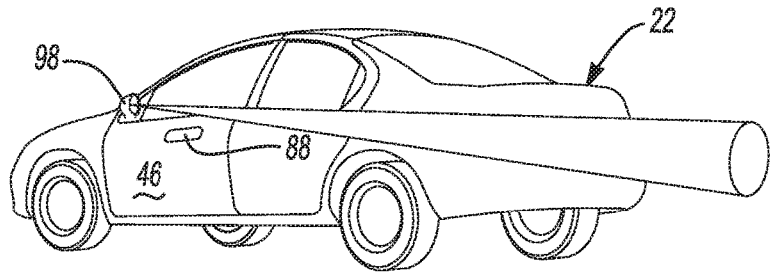
Figure 14B:
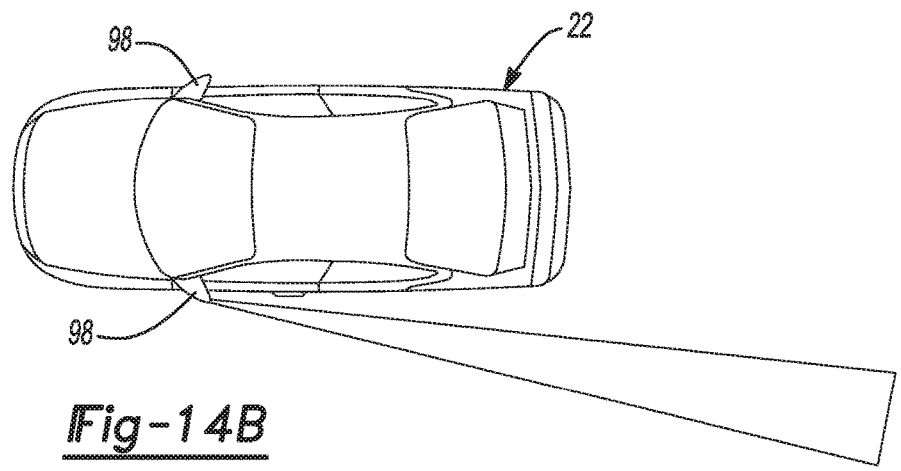
Figure 14C:
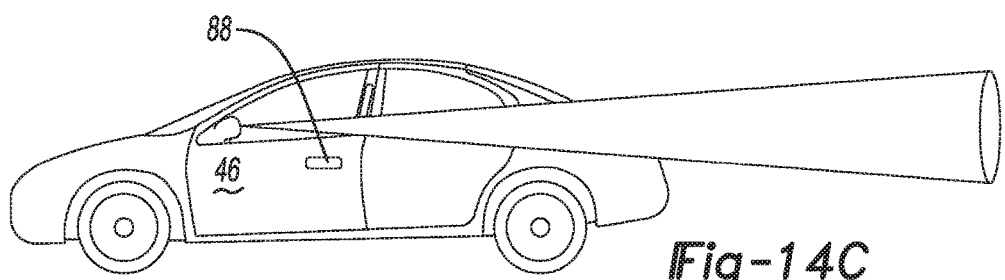
Figure 14D:
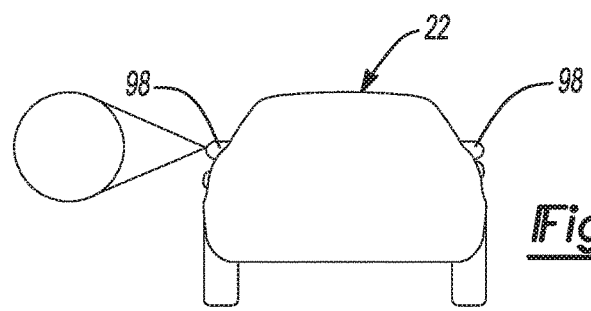
Figure 15A:
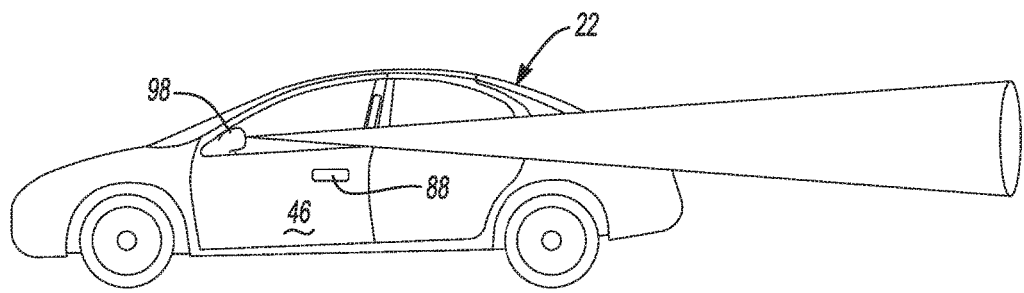
Figure 15B:
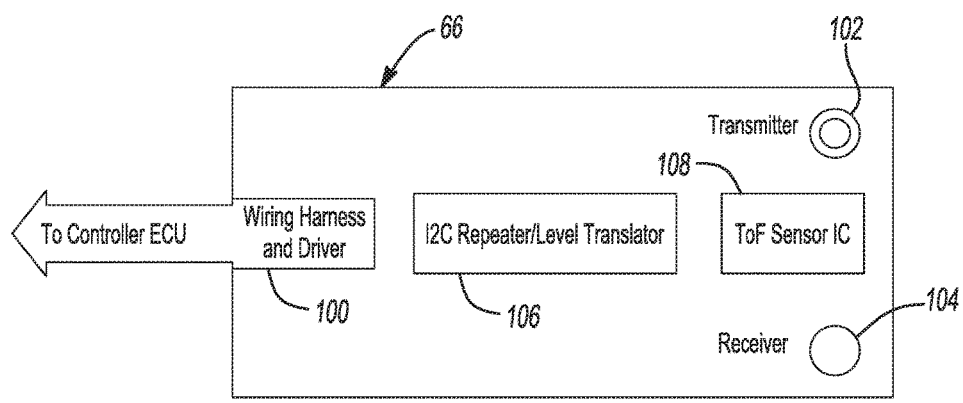
Figure 17:
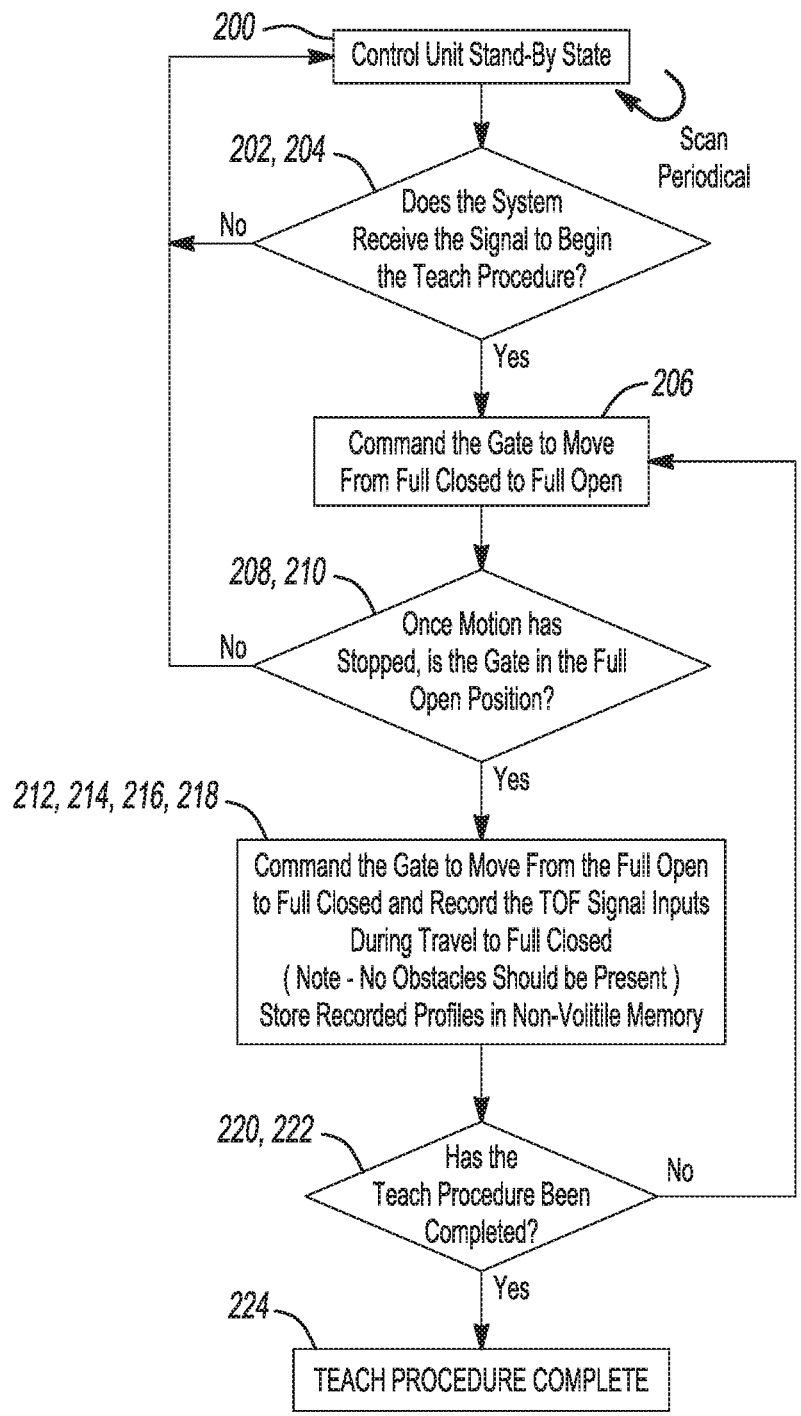
Figure 18:
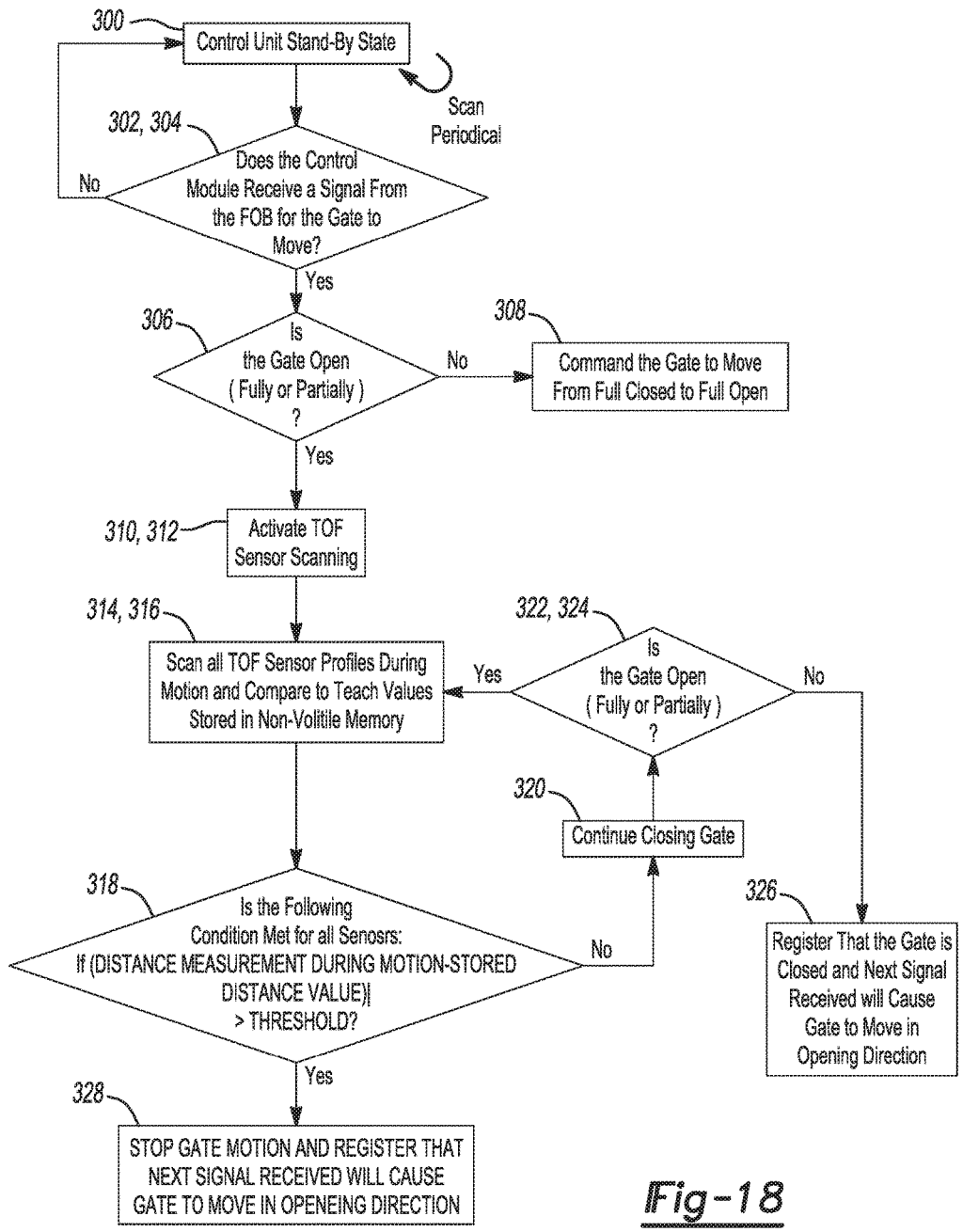
Figure 19:
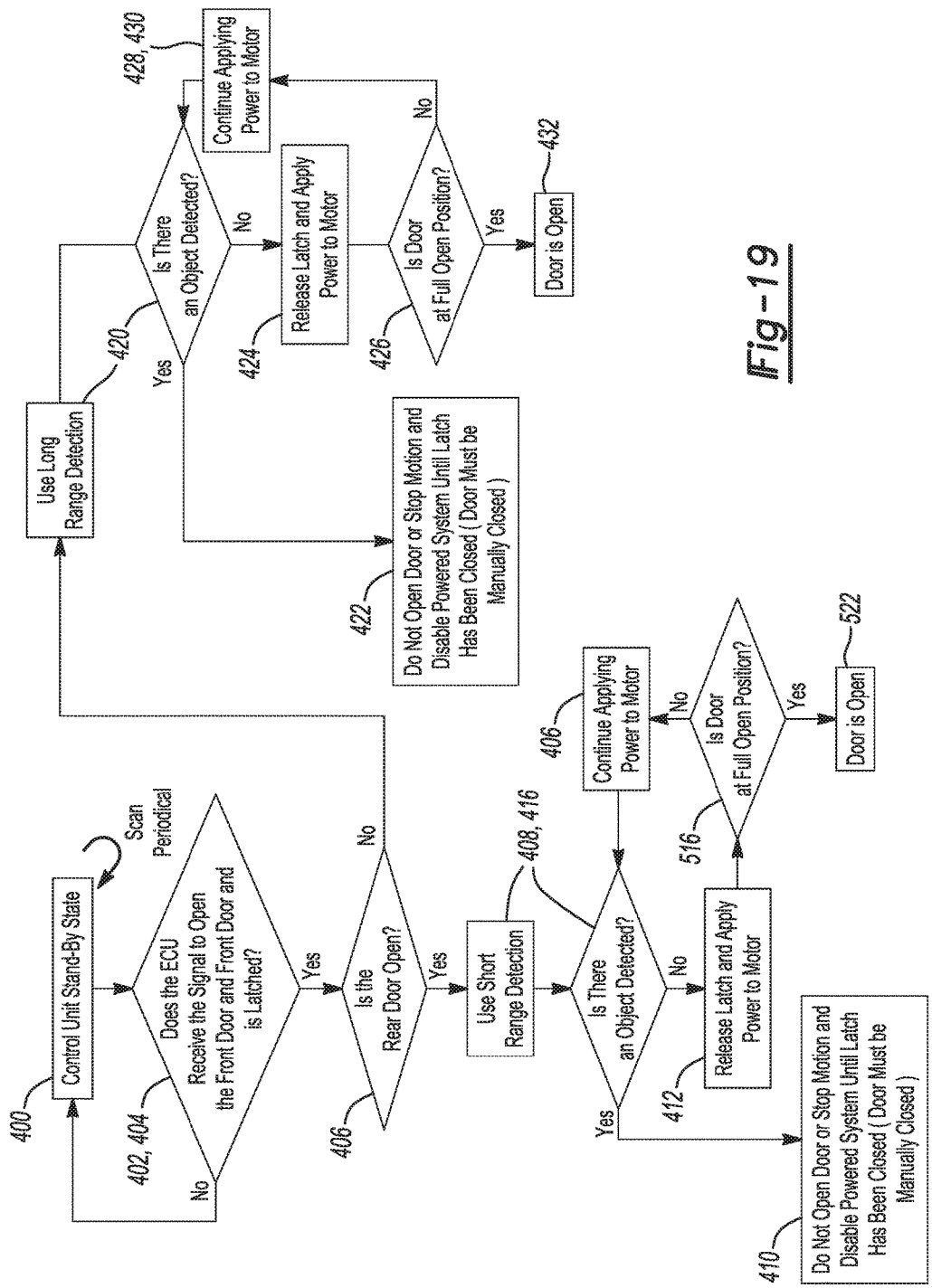
Figure 20:
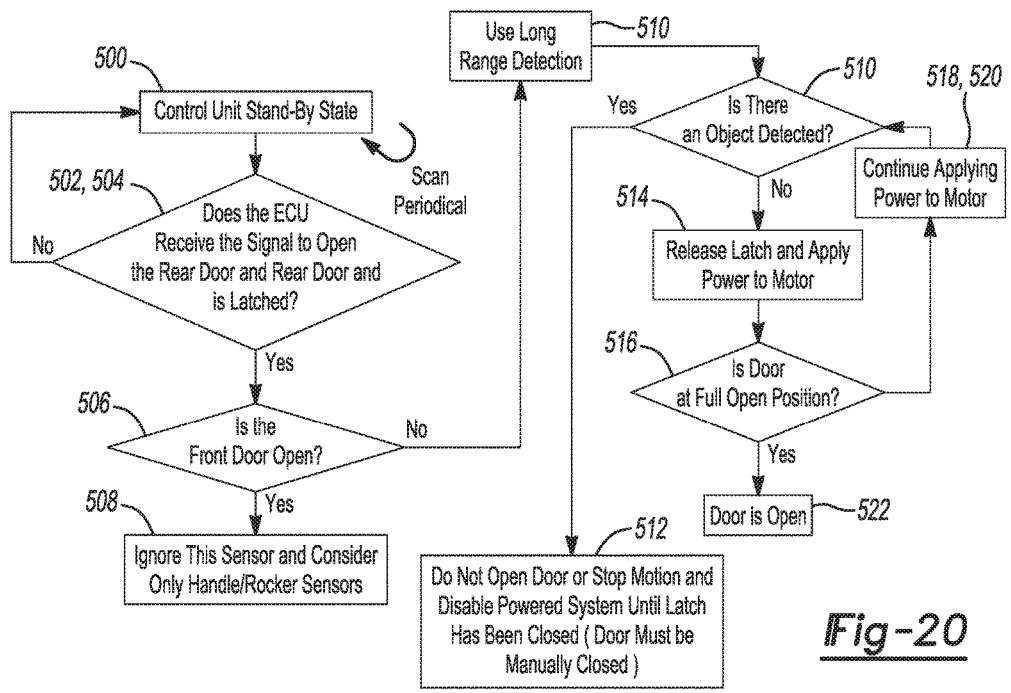
Figure 21:
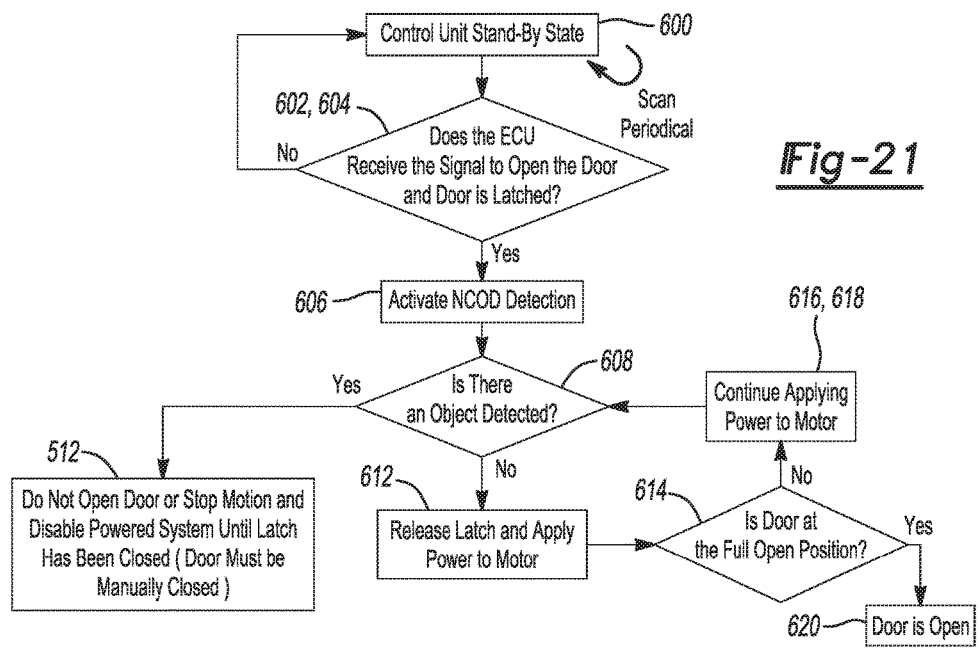
Figure 22:
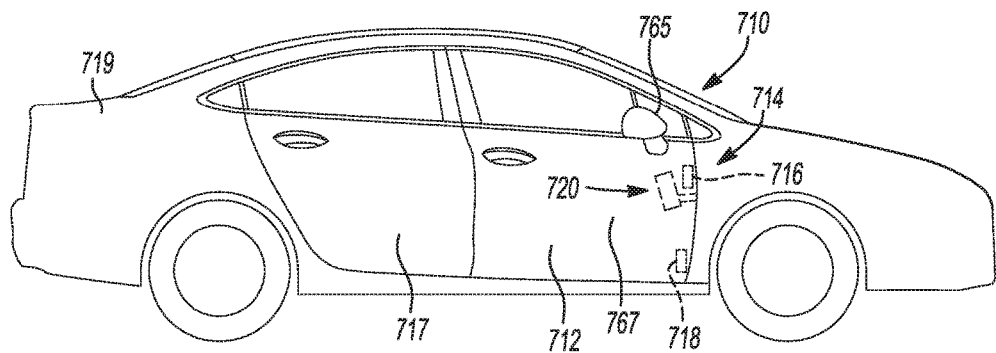
Figure 23:
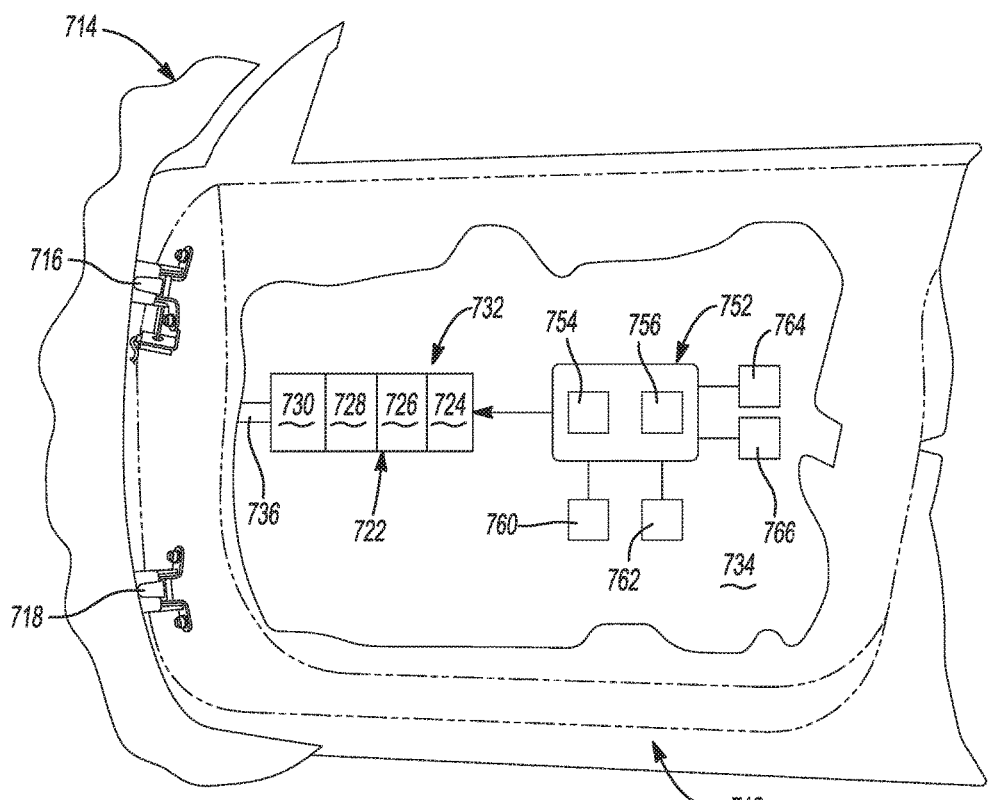
Figure 24A:
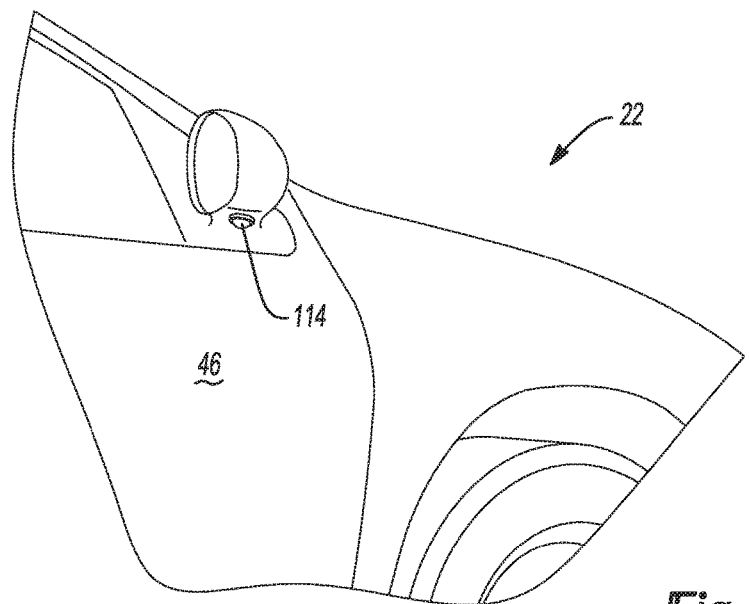
Figure 24B:
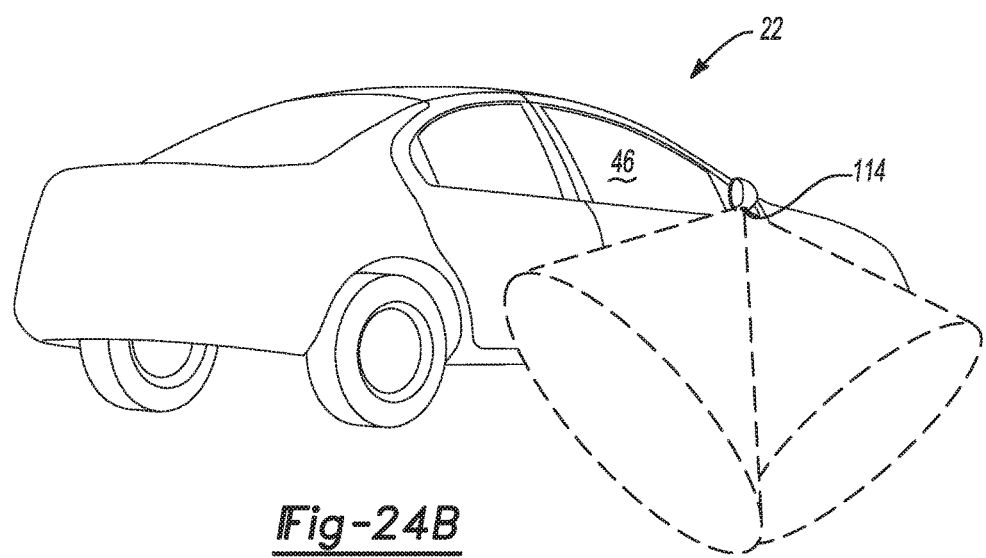
Figures 25A, 25B:
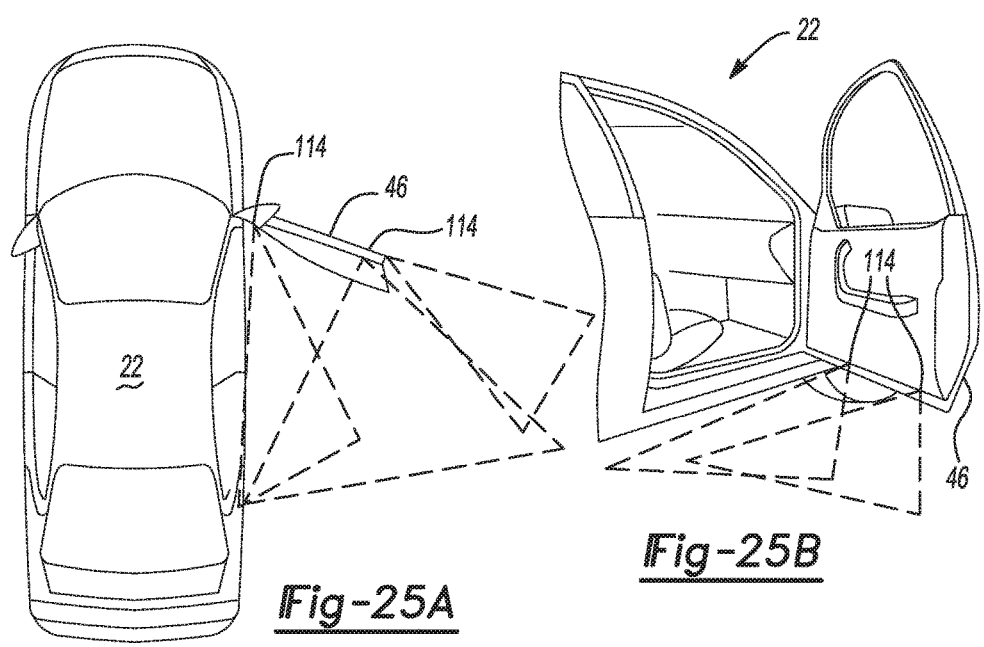
Figures 26A, 26B:
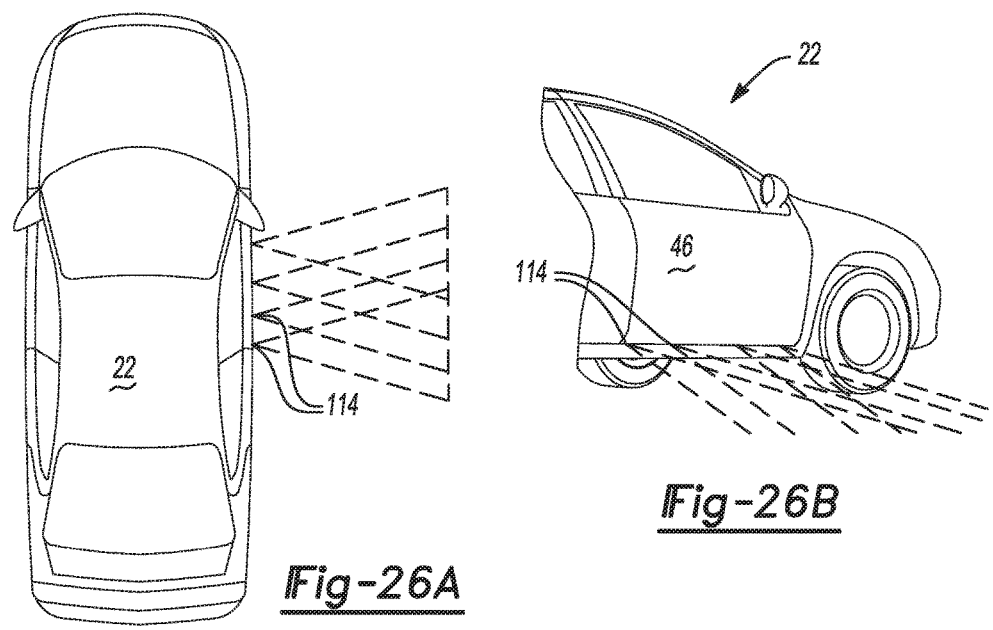
Figure 29:
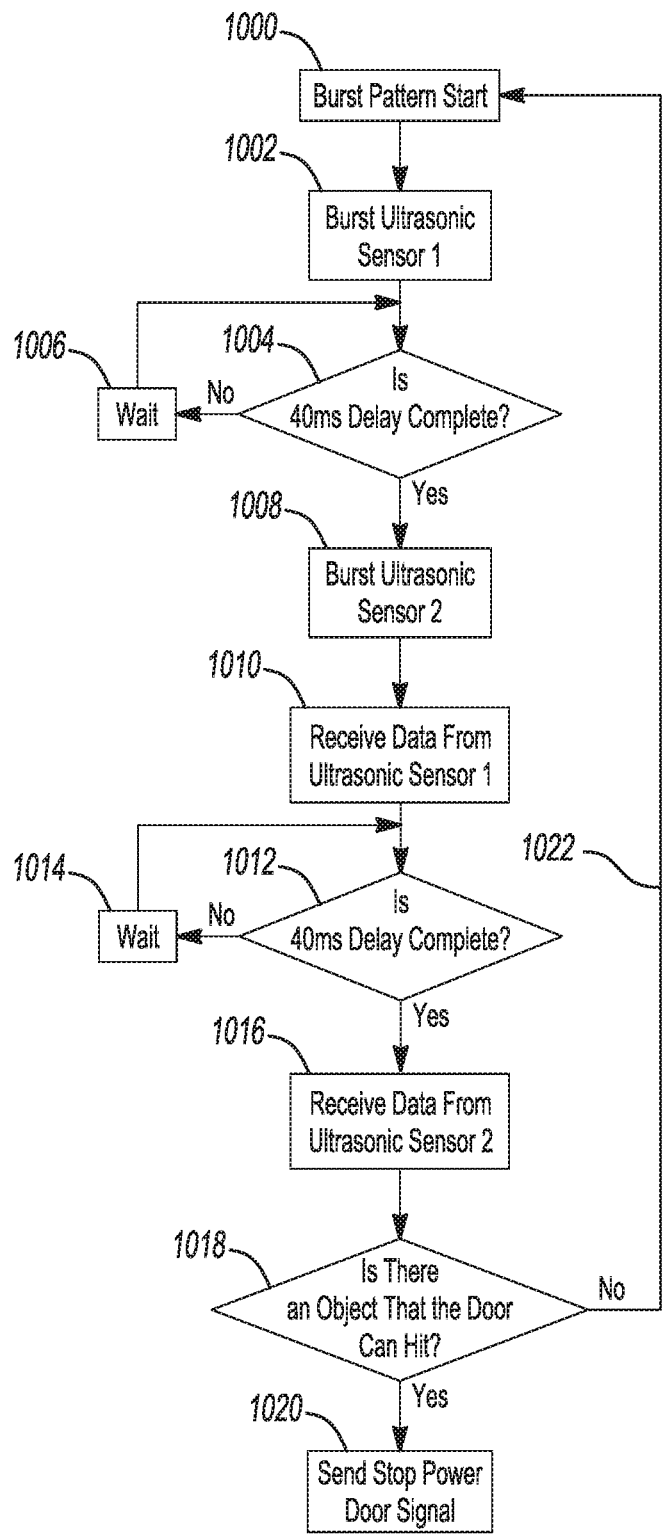

FIGS. 4, 5A, and 5B illustrate a plurality of lift gate TOF (time of flight) proximity sensors of the non-contact obstacle detection system of FIGS. 1 and 2 on a lift gate of a vehicle according to an aspect of the disclosure;

FIG. 6 illustrates a block diagram of a lift gate TOF module of the non-contact obstacle detection system of FIGS. 1 and 2 according to an aspect of the disclosure;

FIGS. 7A-7D illustrate sensing capabilities of infrared TOF sensors of the non-contact obstacle detection system of FIGS. 1 and 2 including infrared TOF sensors in an applique of a door according to an aspect of the disclosure;

FIGS. 8A-8D illustrate sensing capabilities of infrared TOF sensors with radar sensing of the non-contact obstacle detection system of FIGS. 1 and 2 including infrared TOF sensors in the applique of the door according to an aspect of the disclosure;

FIGS. 9A-9D illustrate sensing capabilities of ultrasonic sensors with radar sensing of the non-contact obstacle detection system of FIGS. 1 and 2 according to an aspect of the disclosure;

FIGS. 10A-10D illustrate sensing capabilities of infrared TOF sensors with radar sensing of the non-contact obstacle detection system of FIGS. 1 and 2 according to an aspect of the disclosure;

FIGS. 11A and 11B illustrate a door handle TOF sensor of the non-contact obstacle detection system of FIGS. 1 and 2 according to an aspect of the disclosure;

FIGS. 12A-12D illustrate sensing capabilities of infrared TOF sensors with ultrasonic sensing of the non-contact obstacle detection system of FIGS. 1 and 2 including infrared TOF sensors in the applique of the door according to an aspect of the disclosure;

FIGS. 13A-13D illustrate sensing capabilities of ultrasonic sensors with radar and infrared TOF sensing of the non-contact obstacle detection system of FIGS. 1 and 2 including infrared TOF sensors in an applique of a door according to an aspect of the disclosure;

FIGS. 14A-14D illustrate sensing blind spots with a side view mirror TOF sensor of the non-contact obstacle detection system of FIGS. 1 and 2 according to an aspect of the disclosure;

FIGS. 15A and 15B illustrate a side view mirror TOF sensor of the non-contact obstacle detection system of FIGS. 1 and 2 according to an aspect of the disclosure;

FIGS. 16A-16D illustrate a housing assembly of a TOF sensor of the non-contact obstacle detection system of FIGS. 1 and 2 according to an aspect of the disclosure;

FIG. 17 illustrates steps of a method of teaching a plurality of lift gate TOF modules according to an aspect of the disclosure;

FIG. 18 illustrates steps of a method of operating a lift gate having a plurality of lift gate TOF modules according to an aspect of the disclosure;

FIG. 19 illustrates steps of a method of operating a front door having a side view mirror TOF sensor according to an aspect of the disclosure;

FIG. 20 illustrates steps of a method of operating a rear door using a side view TOF sensor according to an aspect of the disclosure;

FIG. 21 illustrates steps of a method of operating a side door having a door handle TOF sensor according to an aspect of the disclosure;

FIG. 22 is a perspective view of an example motor vehicle equipped with a power door actuation system situated between a front passenger swing door and the vehicle body and which is constructed in accordance with the teachings of the present disclosure;

FIG. 23 is a diagrammatic view of the front passenger door shown in FIG. 25, with various components removed for clarity purposes only, in relation to a portion of the vehicle body and which is equipped with the power door actuation system of the present disclosure;

FIGS. 24A and 24B illustrate a pair of ultrasonic transducers of the non-contact obstacle detection system of FIGS. 1 and 2 on a mirror of a vehicle according to an aspects of the disclosure;

FIGS. 25A and 25B illustrate a plurality of ultrasonic transducers of the non-contact obstacle detection system of FIGS. 1 and 2 on a swing door of a vehicle according to an aspects of the disclosure;

FIGS. 26A and 26B illustrate a plurality of ultrasonic transducers of the non-contact obstacle detection system of FIGS. 1 and 2 on a rocker panel of a vehicle according to an aspects of the disclosure;

FIGS. 27A and 27B illustrate a mechanical blocker on a front fender of a vehicle according to an aspects of the disclosure;

FIG. 28 illustrates steps of a method of detecting an object using a pair of ultrasonic transducers according to aspects of the disclosure; and FIG. 29 illustrates steps of a method of operating a pair of ultrasonic transducers in an ultrasonic transducer burst mode according to aspects of the disclosure.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to an obstacle detection system of the type well-suited for use in many applications. More specifically, a non-contact obstacle detection (NCOD) system for a motor vehicle closure system and methods of operating the non-contact obstacle detection system are disclosed herein. The non-contact obstacle detection system of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Referring to the Figures, wherein like numerals indicate corresponding parts throughout the several views, a non-contact obstacle detection system 20 for a motor vehicle 22 is disclosed. As best shown in FIGS. 1 and 2, the non-contact obstacle detection system 20 includes a main electronic control unit 24 that has a plurality of input-output terminals and is adapted to connect to a power source 26 and to a vehicle CAN bus 28 (controller area network).

Figure 3:
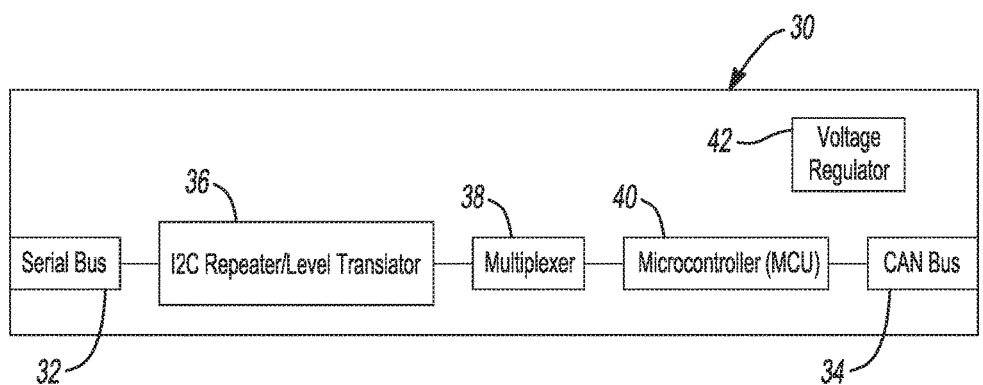
FIG. 3 illustrates a block diagram of a sensor multiplexer hub of the non-contact obstacle detection system of FIGS. 1 and 2 according to an aspect of the disclosure.

A sensor multiplexer hub 30 is coupled to at least one of the plurality of input-output terminals of the main electronic control unit 24 for providing power to the sensor multiplexer hub 30 and for communication with the main electronic control unit 24 via CAN communication. As best shown in FIG. 3, the sensor multiplexer hub 30 includes a hub serial bus interface 32 and a hub CAN bus interface 34. The sensor multiplexer hub 30 additionally includes a hub I²C repeater 36 coupled to the hub serial bus interface 32 to provide for communications on an I²C bus and a multiplexer 38 coupled to the hub I²C repeater 36. The hub I²C repeater 36 can also act as a level translator. In detail, Inter-Integrated Circuit (I²C) buses are generally a multi-master, multi-slave, single-ended, serial computer bus. The sensor multiplexer hub 30 additionally includes a hub microcontroller 40 coupled to the multiplexer 38 and to the hub CAN bus interface 34 and a hub voltage regulator 42 for regulating voltage supplied to the sensor multiplexer hub 30.

Referring back to FIG. 2, a motor 44 and/or a motor controller is also coupled to one of the plurality of input-output terminals of the main electronic control unit 24 (e.g., for moving a vehicle 22 closure member such as a swing door 46 or a lift gate 48, shown in FIG. 4) and may be operated with pulse width modulation by the main electronic control unit 24. Although only one motor 44 is described and shown in the Figures, it should be appreciated that any number of motors 44 may be utilized.

An LCD unit 50 is also coupled to one of the plurality of input-output terminals of the main electronic control unit 24 for displaying information related to the non-contact obstacle detection system 20 to a user (e.g., obstacle warning messages). A wireless interface unit 52 is also coupled to one of the plurality of input-output terminals of the main electronic control unit 24 for wireless communication. At least one angle sensor 54 (FIG. 1) may also be coupled to the sensor multiplexer hub 30. The angle sensor 54 could detect things such as, but not limited to the angle of a swing door 46 of the vehicle 22.

A lift gate sensor assembly 56 includes a plurality of left lift gate TOF modules 58 and a plurality of right lift gate TOF modules 60 for attachment to a lift gate 48 of a vehicle 22 (FIGS. 4, 5A, and 5B) and for detecting obstacles (and gestures) near the lift gate 48 and for outputting lift gate TOF sensor signals. The quantity of lift gate TOF modules 58, 60 depends on the size and shape of the lift gate 48. Time of flight (TOF) sensing allows an absolute distance to be measured independently of a target's reflectance. Sensors utilizing this technology measure the amount of time it takes light to travel from an emitter to the target and back (i.e., time of flight). As described herein, the TOF sensors utilize infrared (IR) light.

As best shown in FIG. 6, the left and right lift gate TOF modules 58, 60 each include a lift gate TOF module CAN bus interface 70 and a plurality of lift gate TOF proximity sensors 62. The lift gate TOF proximity sensors 62 can, for example, have a range of approximately 40 centimeters and can also include an integrated transmitter/receiver in one microchip. The left and right lift gate TOF modules 58, 60 each also include a lift gate TOF module I²C repeater 72 coupled to the lift gate TOF proximity sensors 62 and to the lift gate TOF module CAN bus interface 70.

Referring back to FIG. 2, the lift gate sensor assembly 56 includes a left I²C module 74 coupled to the left lift gate TOF modules 58 for communicating the lift gate TOF sensor signals from the left lift gate TOF modules 58 to the sensor multiplexer hub 30. Similarly, the lift gate sensor assembly 56 additionally includes a right I²C module 76 coupled to the right lift gate TOF modules 60 for communicating the lift gate 48 TOF sensor signals from the right lift gate TOF modules 60 to the sensor multiplexer hub 30. The left I²C module 74 and the right I²C module 76 of the lift gate sensor assembly 56 are coupled to the sensor multiplexer hub 30 for providing power to the lift gate sensor assembly and for communication between the main electronic control unit 24 and the lift gate sensor assembly 56. It should be appreciated that the plurality of lift gate TOF proximity sensors 62 could instead comprise sensors utilizing ultrasonic transducers or radar.

A graphics voltage converter 78 is coupled to the sensor multiplexer hub 30 for converting an input voltage from the sensor multiplexer hub 30 to a graphics output voltage. A GPU 80 (graphics processing unit) is coupled to the graphics voltage converter 78 and configured to operate using the graphics output voltage from the graphics voltage converter 78 for processing graphics data. A camera 82 is coupled to the GPU 80 for attachment to the vehicle 22 and for capturing computer vision imaging. An illumination unit 84 is coupled to the camera 82 for providing illumination for the computer vision imaging by the camera 82. The camera 82 may include complementary metal oxide semi-conductor (CMOS) charge-coupled device (CCD) type image sensors, for example. The camera 82 can generate imaging of a target area and can, for example, be used for determining speed or direction of an object (e.g., an obstacle), the shape and/or contour of the object, and/or otherwise assist the non-contact obstacle detection.

A front and rear side door sensor assembly 86 includes a plurality of door handle TOF sensors 64 each for attachment to one of a front and rear side door handle 88 (FIGS. 7A-7D, 8A-8D, 9A-9D, and 10A-10D) and for detecting obstacles near the front and rear side door handles 88. Each of the plurality of door handle TOF sensors 64 can have a 1 meter range, for example, and may also include an integrated transmitter/receiver in a single microchip. The plurality of door handle TOF sensors 64 are coupled to one another and to at least one of the plurality of input-output terminals of the main electronic control unit 24. As shown in FIGS. 7A-7D, the non-contact obstacle detection system 20 for the motor vehicle 22 may utilize IR TOF sensing alone (including in an applique 89 of the door 46). In contrast, in FIGS. 8A-8D, TOF sensors may be used in the handle 88 (e.g., door handle TOF sensors 64) and the applique 89 of the door 46 for detecting obstacles and gestures, while radar may be used in the rocker panel for detecting obstacles. In FIGS. 9A-9D, ultrasonic sensors or transducers 114 may be disposed in the handle 88 and/or belt line, while radar is utilized in the rocker panel (all are used for obstacle detection). In FIGS. 10A-10D, door handle TOF sensors 64 may be used in the handle 88, and radar may be utilized in the rocker panel.

As best shown in FIGS. 11A and 11B, the plurality of door handle TOF sensors 64 each include a door handle wiring harness connector 90 and a door handle voltage regulator 92 coupled to the door handle wiring harness connector 90 for regulating a door handle input voltage and outputting a door handle output voltage. The plurality of door handle TOF sensors 64 each also include a door handle I²C repeater 94 coupled to the door handle voltage regulator 92 and to the door handle wiring harness connector 90 and a door handle TOF sensor IC 96 coupled to the door handle I²C repeater 94 and the door handle voltage regulator 92. It should be appreciated that the plurality of door handle TOF sensors 64 could instead comprise ultrasonic sensors or transducers 114 (FIGS. 12A-12D and 13A-13D) or radar.

The front and rear side door sensor assembly 86 also includes a plurality of side view mirror TOF sensors 66 for attachment to one of a right and a left side view mirror 98 (FIGS. 7A-7D and 14A-14D) and for detecting obstacles near the right and left side view mirrors 98. The plurality of side view mirror TOF sensors 66, for example, can have a 2.5 meter range. The plurality of side view mirror TOF sensors 66 are coupled to one another and to at least one of the plurality of input-output terminals of the main electronic control unit 24 (FIG. 2). In the case of ultrasonic sensors disposed on the side view mirrors 98 in FIGS. 12A-12B in combination with ultrasonic sensors 114 in the door handle 88 and/or belt line with IR TOF sensors in the applique 89, the ultrasonic sensors 114 may be used for sensing obstacles and the IR TOF sensors in the applique 89 can be used to detect gestures. In FIGS. 13A-13D, ultrasonic sensors 114 can be disposed in the door handle 88 and/or belt line and IR TOF sensors can be disposed in the applique 89 with radar sensors in the rocker panel. the ultrasonic sensors 114 and radar may be used for sensing obstacles and the ultrasonic sensors 114 in the applique 89 can be used to detect gestures.

As best shown in FIGS. 15A and 15B, the plurality of side view mirror TOF sensors 66 each include a side view mirror wiring harness connector and driver 100 and a side view mirror transmitter 102 (e.g., IR light emitting diode transmitter, for example, OSRAM SFH 4550) for transmitting a side view TOF beam. The plurality of side view mirror TOF sensors 66 each also include a side view mirror receiver 104 (e.g., photodiode, for example, OSRAM SFH 213 or SFH 213 FA) for receiving a reflected side view TOF beam in response to the transmission of the side view TOF beam by the side view mirror transmitter 102. The side view mirror receiver 104 converts the return signal into a current signature. A side view mirror I$^2$C repeater 106 is coupled to the side view mirror wiring harness connector and driver 100. A side view mirror TOF sensor IC 108 (integrated circuit, for example, Intersil ISL29501) is coupled to the side view mirror transmitter 102 and the side view mirror receiver 104 and to the side view mirror I$^2$C repeater 106. The side view mirror TOF sensor IC 108 calculates the time of flight of the target using signal processing (i.e., the time of flight is proportional to the target distance). It should be appreciated that the plurality of side view mirror TOF sensors 66 could instead comprise sensors utilizing ultrasonic transducers 114 (FIGS. 12A-12D) or radar. As illustrated in FIGS. 14A-14D, the plurality of side view mirror TOF sensors 66 can also be used during motion of the vehicle 22 for monitoring blind spots.

A LIN bus interface unit 110 (FIG. 2) is coupled to at least one of the plurality of input-output terminals of the main electronic control unit 24. The LIN bus interface provides for communication over a Local interconnect network (LIN). Local interconnect network provides for communication between components on the vehicle 22 via a serial network protocol. An ultrasonic sensor driver ECU 112 (electronic control unit) is coupled to the LIN bus interface. A plurality of the ultrasonic transducers 114 are coupled to the ultrasonic sensor driver ECU 112 for attachment to at least one of a front and a rear power swing door 46 (e.g., belt line or rocker panel location of the vehicle 22, as shown in FIGS. 13A-13D and 14A-14D) and for detecting obstacles near the front and rear power swing doors 46. It should be appreciated that the plurality of ultrasonic transducers 114 could instead comprise sensors utilizing TOF technology (FIGS. 8A-8D and 9A-9D) or radar (FIG. 10A-10D).

Figure 16A:
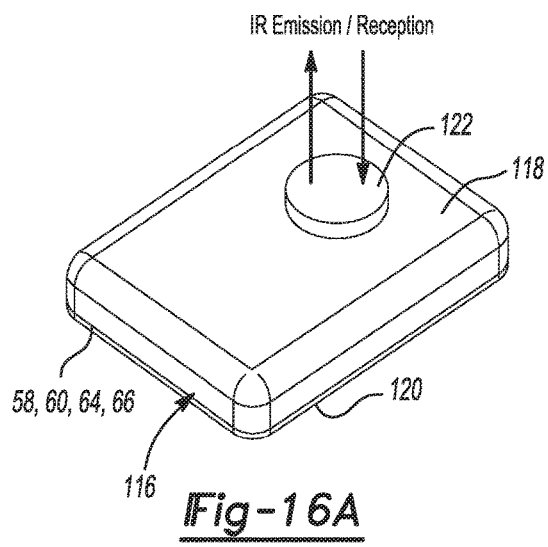
Figure 16C:
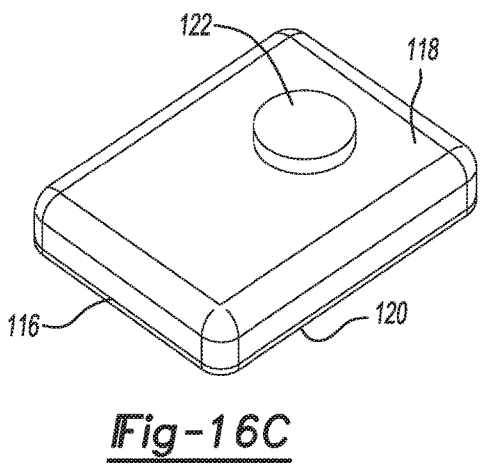
Figure 16B:
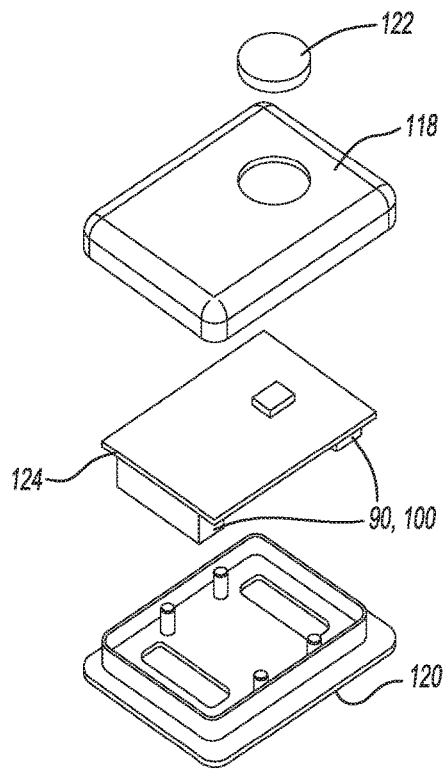
Figure 16D:
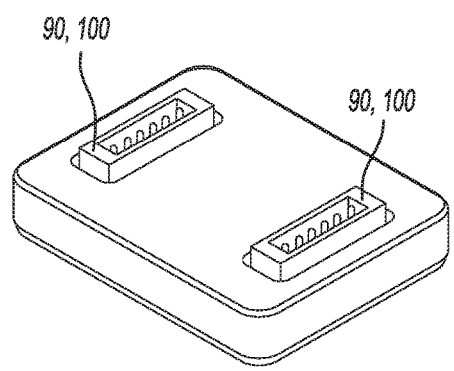

As best shown in FIGS. 16A and 16B, each of the lift gate TOF modules 58, 60, door handle TOF sensors 64, and side view mirror TOF sensors 66 can include a housing assembly 116 that comprises a housing top 118 and a housing bottom 120, each made of plastic (e.g., polypropylene and/or acrylonitrile butadiene styrene), for example. The housing top 118 includes an opening containing a window 122 of acrylic (e.g., that is transparent to infrared light). In detail, the window 122 has a low friction coating (such as an omniphobic coating like fluorodecyl POSS), so that dirt/contamination cannot adhere to the window 122. The window 122 must remain debris free to permit the infrared TOF to function effectively. A heater could also be added to the housing assembly 116 to melt snow or ice off of the window 122. A sensor printed circuit board 124 (FIG. 16B) that has a sensor IC attached as well as a plurality of wiring harness connectors (e.g., door handle wiring harness connector 90 or side view mirror wiring harness connector 100) is disposed within the housing assembly 116. The housing bottom 120 can include one or more apertures to accommodate the wiring harness connectors. While such a specific structure may be utilized, it should be understood that each of the lift gate TOF modules 58, 60, door handle TOF sensors 64, and side view mirror TOF sensors 66 may take other forms.

As illustrated in FIG. 17, a method of teaching a plurality of lift gate TOF modules 58, 60 is also disclosed and may only be performed once at a vehicle manufacturer so that the non-contact obstacle detection system 20 of the motor vehicle 22 learns the shut face/seal geometry as the lift gate 48 is closing. The non-contact obstacle detection system 20 learns a shut face distance value from each lift gate TOF modules 58, 60 and will record teach data (i.e., recorded profiles) in non-volatile memory. The method of teaching a plurality of lift gate TOF modules 58, 60 includes the step of 200 maintaining the main electronic control unit 24 in a stand-by state. Then, 202 periodically scanning for a lift gate TOF teach signal using the main electronic control unit 24 in the stand-by state. The method proceeds by 204 returning to the stand-by state in response to not detecting the lift gate TOF teach signal. Next, 206 commanding a lift gate 48 to move from a full closed position to a full open position in response to detecting the lift gate TOF teach signal. The method proceeds by, 208 determining whether the lift gate 48 is in the full open position once motion of the lift gate 48 has ceased (e.g., using the angle sensor 54, Hall-effect sensors, or other sensors to detect the position). The next step of the method is 210 returning to the stand-by state in response to a determination that the lift gate 48 is not in the full open position. Then, 212 commanding the lift gate 48 to move from the full open position to the full closed position in response to determining that the lift gate 48 is in the full open position. The method continues by, 214 recording a plurality of lift gate TOF signals from the lift gate TOF modules 58, 60 using the main electronic control unit 24 during movement of the lift gate 48 to the full closed position. The method also includes the steps of 216 generating a plurality of recorded profiles based on the plurality of lift gate TOF signals and 218 storing the plurality of recorded profiles in a non-volatile memory. Then, the method includes the step of 220 determining whether the method of teaching the plurality of lift gate TOF modules 58, 60 has been completed. Then, 222 returning to the step of commanding the lift gate 48 to move from the full closed position to the full open position (i.e., step 206) in response to a determination that the method of teaching has not been completed. The method concludes by, 224 ending the method of teaching the plurality of lift gate TOF modules 58, 60 in response to determining that the method of teaching the plurality of lift gate TOF modules 58, 60 has been completed. During normal cycling of the lift gate 48, the system will compare the data from this method of teaching (i.e., recorded profiles) to real-time data to determine if there is an object or obstacle present.

As best shown in FIG. 18, a method of operating a lift gate 48 (i.e., normal operation) having a plurality of lift gate TOF modules 58, 60 is also disclosed and includes the step of 300 maintaining the main electronic control unit 24 in a stand-by state. Then, 302 periodically scanning for a lift gate fob signal using the main electronic control unit 24 in the stand-by state and 304 returning to the stand-by state in response to not detecting the lift gate fob signal. The method continues by, 306 determining whether the lift gate 48 is in an open position in response to detecting the lift gate fob signal.

The method of operating a lift gate 48 having a plurality of lift gate TOF modules 58, 60 proceeds by, 308 commanding the lift gate 48 to move from a full closed position to a full open position in response to a determination that the lift gate 48 is not in the open position. Next, 310 commanding the lift gate 48 to move from the open position to the full closed position and 312 activating a scan of a plurality of lift gate TOF signals from a plurality of lift gate TOF modules 58, 60. The next step of the method is 314 generating a plurality of lift gate 48 TOF sensor profiles based on the plurality of lift gate TOF signals. Then, 316 comparing the plurality of lift gate TOF sensor profiles to a plurality of stored recorded profiles.

The method of operating a lift gate 48 having a plurality of lift gate TOF modules 58, 60 then includes the step of 318 determining whether a difference between a distance measured during motion of the lift gate 48 and a stored distance value exceeds a threshold. The method also includes the step of 320 continuing to close the lift gate 48 in response to a determination that the difference between the distance measured during motion of the lift gate 48 and the stored distance value does not exceed the threshold.

The method of operating a lift gate 48 having a plurality of lift gate TOF modules 58, 60 also includes the step of 322 determining whether the lift gate 48 is in the open position and 324 returning to the step of generating a plurality of lift gate TOF sensor profiles based on the plurality of lift gate TOF signals in response to a determination that the lift gate 48 is in the open position. The next step of the method is 326 registering that the lift gate 48 is closed and the next lift gate fob signal will cause the lift gate 48 to move in an opening direction in response to a determination that the lift gate 48 is not in the open position. The method concludes by, 328 stopping motion of the lift gate 48 and 330 registering that the next lift gate fob signal will cause the lift gate 48 to move in the opening direction in response to a determination that the difference between the distance measured during motion of the lift gate 48 and the stored distance value exceeds the threshold.

As illustrated in FIG. 19, a method of operating a front door (e.g., swing door 46) having a side view mirror TOF sensor 66 is additionally disclosed and includes the step of 400 maintaining the main electronic control unit 24 in a stand-by state. Then, 402 periodically scanning for a front door opening signal using the main electronic control unit 24 in the stand-by state. The next step of the method is 404 returning to the stand-by state in response to not detecting the front door opening signal.

The method of operating a front door having a side view mirror TOF sensor 66 also includes the step of 406 determining whether a rear door is in an open position in response to detecting the front door opening signal. The method proceeds by, 408 detecting an obstacle using short range detection with the plurality of side view mirror TOF sensors 66 in response a determination that the rear door is in the open position. Next, 410 ceasing door opening and disabling system in response to the obstacle being detected. It should be appreciated that while these steps involve the door opening, the method may alternatively include closing the closure member or door.

The method of operating a front door having a side view mirror TOF sensor 66 proceeds by, 412 releasing a latch and applying power to a motor 44 in response to the obstacle not being detected and determining whether the front door is in a full open position. The next step of the method is 414 continuing to apply power to the motor 44 in response to a determination that the front door is not in the full open position. The method also includes the steps of 416 returning to the step of detecting if the obstacle is detected using short range detection and 418 concluding that the front door is open in response to a determination that the front door is in the full open position.

The method of operating a front door having a side view mirror TOF sensor 66 continues with the step of 420 detecting if the obstacle is detected using long range detection with the plurality of side view mirror TOF sensors 66 in response to a determination that the rear door is not in the open position. Then, the method includes the step of 422 ceasing door opening and disabling system in response to the obstacle being detected. The method proceeds by, 424 releasing the latch and applying power to the motor 44 in response to the obstacle not being detected.

The method operating a front door having a side view mirror TOF sensor 66 then includes the step of 426 determining whether the front door is in the full open position. Next, 428 continuing to apply power to the motor 44 in response to a determination that the front door is not in the full open position. The method proceeds by, 430 returning to the step of detecting if the obstacle is detected using long range detection. The method then completes with the step of 432 concluding that the front door is open in response to a determination that the front door is in the full open position.

As illustrated in FIG. 20, a method of operating a rear door (e.g., swing door 46) using a side view mirror TOF sensor 66 is also disclosed and includes the step of 500 maintaining the main electronic control unit 24 in a stand-by state. Then, 502 periodically scanning for a rear door opening signal using the main electronic control unit 24 in the stand-by state and 504 returning to the stand-by state in response to not detecting the front door opening signal.

The method of operating a rear door using a side view mirror TOF sensor 66 continues with the step of 506 determining whether a front door is in an open position in response to detecting the front door opening signal. Then, 508 ignoring the side view mirror TOF sensor 66 of the front door in response to a determination that the front door is in the open position. The next step of the method is 510 detecting an obstacle using long range detection with the side view mirror TOF sensor 66 in response to a determination that the front door is not in the open position. The method continues by 512 ceasing door opening and disabling system in response to the obstacle being detected. It should be understood that while these steps involve the door opening, the method may alternatively include closing the door or closure member.

The method of operating a rear door using a side view mirror TOF sensor 66 also includes the step of 514 releasing the latch and applying power to the motor 44 in response to the obstacle not being detected. Next, 516 determining whether the rear door is in the full open position and 518 continuing to apply power to the motor 44 in response to a determination that the front door is not in the full open position. The method continues by, 520 returning to the step of detecting if the obstacle is detected using long range detection. The final step of the method is 522 concluding that the rear door is open in response to a determination that the rear door is in the full open position.

As illustrated in FIG. 21, a method of operating a side door (e.g., swing door 46) having a door handle TOF sensor 64 and rocker panel sensors is additionally disclosed and includes the step of 600 maintaining the main electronic control unit 24 in a stand-by state. Then, 602 periodically scanning for a side door opening signal using the main electronic control unit 24 in the stand-by state. The method continues by 604 returning to the stand-by state in response to not detecting the side door opening signal.

The method of operating a side door having a door handle TOF sensor 64 also includes the step of 606 activating non-contact obstacle detection in response to detecting the side door opening signal. Next, 608 detecting an obstacle using the door handle TOF sensor 64 in response to a determination that the side door is not in the open position. The method proceeds by 610 ceasing door opening and disabling the system in response to the obstacle being detected.

The method of operating a side door having a door handle TOF sensor 64 also includes the step of 612 releasing the latch and applying power to the motor 44 in response to the obstacle not being detected. Then, 614 determining whether the side door is in the full open position. The method then includes the step of 616 continuing to apply power to the motor 44 in response to a determination that the front door is not in the full open position. Next, 618 returning to the step of detecting if the obstacle is detected using the door handle TOF sensor 64 and 620 concluding that the side door is open in response to a determination that the side door is in the full open position.

Referring initially to FIG. 22, an example motor vehicle 710 is shown to include a first passenger door 712 pivotably mounted to a vehicle body 714 via an upper door hinge 716 and a lower door hinge 718 which are shown in phantom lines. In accordance with the present disclosure, a power door actuation system 720 is integrated into the pivotal connection between first passenger door 712 and a vehicle body 714. The power door actuation system 720 can be integrated into the non-contact obstacle detection system 20 of the present disclosure. In accordance with a preferred configuration, power door actuation system 720 generally includes a power actuator or power-operated swing door actuator secured within an internal cavity of passenger door 712 and including an electric motor driving a spindle drive mechanism having an extensible component that is pivotably coupled to a portion of the vehicle body 714. Driven rotation of the spindle drive mechanism causes controlled pivotal movement of passenger door 712 relative to vehicle body 714.

Each of upper door hinge 716 and lower door hinge 718 include a door-mounting hinge component and a body-mounted hinge component that are pivotably interconnected by a hinge pin or post. While power door actuation system 720 is only shown in association with front passenger door 712, those skilled in the art will recognize that the power door actuation system can also be associated with any other door or lift gate of vehicle 710 such as rear passenger doors 717 and decklid 719.

Power door actuation system 720 is diagrammatically shown in FIG. 23 to include a power swing door actuator 722 configured to include an electric motor 724, a reduction geartrain 726, a slip clutch 728, and a drive mechanism 730 which together define a power assembly 732 that is mounted within an interior chamber 734 of door 712. Power swing door actuator 722 further includes a connector mechanism 736 configured to connect an extensible member of drive mechanism 730 to vehicle body 714. As also shown, an electronic control module 752 is in communication with electric motor 724 for providing electric control signals thereto. Electronic control module 752 can include a microprocessor 754 and a memory 756 having executable computer readable instructions stored thereon.

Although not expressly illustrated, electric motor 724 can include Hall-effect sensors for monitoring a position and speed of vehicle door 712 during movement between its open and closed positions. For example, one or more Hall-effect sensors may be provided and positioned to send signals to electronic control module 752 that are indicative of rotational movement of electric motor 724 and indicative of the rotational speed of electric motor 724, e.g., based on counting signals from the Hall-effect sensor detecting a target on a motor output shaft. In situations where the sensed motor speed is greater than a threshold speed and where the current sensor registers a significant change in the current draw, electronic control module 752 may determine that the user is manually moving door 712 while motor 724 is also operating, thus moving vehicle door 712 between its open and closed positions. Electronic control module 752 may then send a signal to electric motor 724 to stop motor 724 and may even disengage slip clutch 728 (if provided). Conversely, when electronic control module 752 is in a power open or power close mode and the Hall-effect sensors indicate that a speed of electric motor 724 is less than a threshold speed (e.g., zero) and a current spike is registered, electronic control module 752 may determine that an obstacle is in the way of vehicle door 712, in which case the electronic control system may take any suitable action, such as sending a signal to turn off electric motor 736. As such, electronic control module 752 receives feedback from the Hall-effect sensors to ensure that a contact obstacle has not occurred during movement of vehicle door 712 from the closed position to the open position, or vice versa.

As is also schematically shown in FIG. 23, electronic control module 752 can be in communication with a remote key fob 760 or an internal/external handle switch 762 for receiving a request from a user to open or close vehicle door 712. Put another way, electronic control module 752 receives a command signal from either remote key fob 760 and/or internal/external handle switch 762 to initiate an opening or closing of vehicle door 712. Upon receiving a command, electronic control module 752 proceeds to provide a signal to electric motor 724 in the form of a pulse width modulated voltage (for speed control) to turn on motor 724 and initiate pivotal swinging movement of vehicle door 712. While providing the signal, electronic control module 752 also obtains feedback from the Hall-effect sensors of electric motor 724 to ensure that a contact obstacle has not occurred. If no obstacle is present, motor 736 will continue to generate a rotational force to actuate spindle drive mechanism 730. Once vehicle door 712 is positioned at the desired location, motor 724 is turned off and the "self-locking" gearing associated with gearbox 726 causes vehicle door 712 to continue to be held at that location. If a user tries to move vehicle door 712 to a different operating position, electric motor 724 will first resist the user's motion (thereby replicating a door check function) and eventually release and allow the door to move to the newly desired location. Again, once vehicle door 712 is stopped, electronic control module 752 will provide the required power to electric motor 724 to hold it in that position. If the user provides a sufficiently large motion input to vehicle door 712 (i.e., as is the case when the user wants to close the door), electronic control module 752 will recognize this motion via the Hall effect pulses and proceed to execute a full closing operation for vehicle door 712.

Electronic control module 752 can also receive an additional input from a sensor, as previously disclosed herein, positioned on a portion of vehicle door 712, such as on a door mirror 765, or the like. Sensor 764 assesses if an obstacle, such as another car, tree, or post, is near or in close proximity to vehicle door 712. If such an obstacle is present, sensor 764 will send a signal to electronic control module 752, and electronic control module 752 will proceed to turn off electric motor 724 to stop movement of vehicle door 712, and thus prevent vehicle door 712 from hitting the obstacle. This provides a non-contact obstacle avoidance system. In addition, or optionally, a contact obstacle avoidance system can be placed in vehicle 710 which includes a contact sensor 766 mounted to door, such as in association with molding component 767, and operable to send a signal to controller 752.

A power actuator disclosed in commonly-owned U.S. Pat. No. 9,174,517, incorporated by reference herein, is one non-limiting example of a power closure arrangement configured to be easily integrated into the non-contact obstacle detection system of the present disclosure. Specifically, this is an example of a non-contact obstacle detection system that can be used in association with the motor of the power actuator to drive the closure member, and an absolute position sensor can be used to determine the full open position. Other powered devices, such as power release latches can be used with this non-contact obstacle detection system. For example, non-limiting examples of such power release latches are disclosed in US Publication No. 2015/0330116 and US Publication No. 2012/0313384, each of which is incorporated by reference herein. Similarly, a power lift gate actuator capable of association herewith is disclosed in WO 2014/199235 as is likewise incorporated herein. Finally, a powered strut device for use in power lift gate systems is disclosed in US Publication No. 2015/0376929 and its teachings are further incorporated herein by reference.

According to aspects of the disclosure, the plurality of ultrasonic transducers 114 or sensors coupled to the ultrasonic sensor driver ECU 112 described above can, for example, comprise ultrasonic transducers 114 manufactured by Murata, part number MA-58MF14-7N. Such ultrasonic transducers 114 can exhibit directivity (i.e., the degree to which the radiation emitted from the ultrasonic transducer 114 is concentrated in a single direction). The ultrasonic sensor driver ECU 112 utilized herein, may for example comprise elmos E524.08 or E524.09 ultrasonic sensor drivers. Various software strategies can be employed including auto threshold generation, which is used to eliminate ground reflections. Other software strategies can include, but are not limited to, sensitivity time control (uses fixed versus increasing gain over time), near field threshold generation (used to reduce/eliminate ringing characteristics that occur during transmission bursts), and controllable listening window length (varies the transmit and receive time). However, it should be appreciated that various other types of ultrasonic transducers 114, ultrasonic transducer driver ECUs 112, and/or software strategies may be utilized.

FIGS. 24A and 24B illustrate a specific packaging location and sensing zones of the ultrasonic transducers 114 on the underside of an outside mirror of the vehicle 22. Specifically, a pair of ultrasonic transducers 114 can be mounted with sensing zones shown in FIGS. 24A and 24B. The ultrasonic sensing zones are projected backward to provide NCOD coverage to a rear door (i.e., for a four door vehicle) as well. The ultrasonic sensing zones protect the front door during the power open cycle.

According to aspects of the disclosure, the plurality of ultrasonic transducers 114 can, for example, include a first ultrasonic transducer 114 (e.g., with an eighty degree sense zone) and a second ultrasonic transducer 114 (e.g., with a thirty four degree sense zone) disposed along a lower inner edge of the swing door 46 (FIGS. 25A and 25B). In more detail, the first ultrasonic transducer 114 is used to detect objects in the path of the closing door (i.e., the first ultrasonic transducer 114 can be off while the swing door 46 is opening). The second ultrasonic transducer 114 can also be used to detect objects in the path of closing swing door 46 (e.g., front door of the vehicle 22), such as a knee, and the second ultrasonic transducer 114 can also be off or disabled while the swing door 46 is opening. A third ultrasonic transducer 114 can also be implemented for non-contact obstacle detection of the rear door while opening.

FIGS. 26A and 26B illustrate the plurality of ultrasonic transducers 114 disposed in a rocker panel of the vehicle 22 (e.g., under the front door). Such ultrasonic transducers 114 disposed on or inside a rocker panel can be used to detect objects (e.g., the curb) in the path of the front door (e.g., swing door 46) while it is opening or while the front door is closing (e.g., a leg).

According to other aspects of the present disclosure, a mechanical block 800 (FIGS. 27A and 27B) can be disposed at the front door (swing door 46), near hinges 802 of the door 46 to prevent a pinch condition (e.g., pinched fingers). The mechanical block 800 can, for example, be coupled to an inside edge of a front door fender 804. As the door 46 opens, the front edge of the door 46 swings inwardly and creates a cavity between the front edge and an edge of the front door fender 804. By placing the mechanical block 800 on the front door fender 804, the cavity is never formed, since the mechanical block 800 would keep the same distal relationship to the front edge of the door 46 as it swings inwardly.

As illustrated in FIG. 28, a method of detecting an object using a pair of ultrasonic transducers 114 is disclosed. While a pair of ultrasonic transducers 114 is employed, it should be appreciated that any number of ultrasonic transducers 114 may alternatively be used. The method includes the step of 900 receiving a command to open a swing door 46. Next, 902 starting an ultrasonic transducer burst pattern (e.g., instantaneous or short instance of emission from the ultrasonic transducers 114 using the pair of ultrasonic transducers 114. The method proceeds by 904 determining whether an object is detected by the pair of ultrasonic transducers 114 during the ultrasonic burst pattern. The method continues by 906 stopping the ultrasonic transducer burst pattern in response to the object being detected.

The method can also include the step of 908 determining whether a first predetermined amount of time (e.g., 500 milliseconds) has elapsed in response to the object not being detected. The method proceeds with the step of 910 waiting while the pair of ultrasonic transducers 114 is bursting during the ultrasonic transducer burst pattern after determining whether the first predetermined amount of time has elapsed. Next, 912 continuing to determine whether an object is detected by the pair of ultrasonic transducers 114 in response to the object not being detected and after waiting while the pair of ultrasonic transducers 114 is bursting during the ultrasonic transducer burst pattern.

The method can then continue by 914 starting to move the swing door 46 in response to the determination that the first predetermined amount of time has elapsed and the object has not been detected. The method also includes the step of 916 determining whether an object is detected by the pair of ultrasonic transducers 114 while the swing door is moving. Next, 918 stopping the swing door and the ultrasonic transducer burst pattern in response to the object being detected. The next step of the method is 920 determining whether the swing door 46 has completed its cycle (e.g., completely opened) in response to the object not being detected. Next, 922 waiting while the pair of ultrasonic transducers 114 is bursting during the ultrasonic transducer burst pattern in response to a determination that the swing door 46 has not completed its cycle. The method proceeds by 924 continuing to determine whether an object is detected by the pair of ultrasonic transducers 114 in response to the object not being detected and after waiting while the pair of ultrasonic transducers 114 is bursting. The method also includes the step of 926 stopping the ultrasonic transducer burst pattern in response to the door 46 completing its cycle and the object not being detected.

As illustrated in FIG. 29, a method of operating a pair of ultrasonic transducers 114 in an ultrasonic transducer burst mode is also disclosed. The method includes the step of 1000 initiating an ultrasonic transducer burst pattern using the pair of ultrasonic transducers 114 including a first ultrasonic transducer 114 and a second ultrasonic transducer 114. The method proceeds by 1002 bursting the first ultrasonic transducer 114 and 1004 determining whether a first predetermined period of time (e.g., 40 milliseconds) has elapsed after bursting the first ultrasonic transducer 114. The method also includes the step of 1006 waiting in response to a determination that the first predetermined period of time has not elapsed after bursting the first ultrasonic transducer 114.

The method then continues by 1008 bursting the second ultrasonic transducer 114 in response to a determination that the first predetermined period of time has elapsed after bursting the first ultrasonic transducer 114. The method continues by 1010 receiving a first set of data from the first ultrasonic transducer 114 after bursting the second ultrasonic transducer 114.

The method proceeds with the step of 1012 determining whether a second predetermined period of time (e.g., 40 milliseconds) has elapsed after bursting the second ultrasonic transducer 114. Next, 1014 waiting in response to a determination that the second predetermined period of time has not elapsed after bursting the second ultrasonic transducer 114. The method then includes the step of 1016 receiving a second set of data from the second ultrasonic transducer 114 after waiting in response to a determination that the second predetermined period of time has not elapsed after bursting the second ultrasonic transducer 114. The next step of the method is 1018 determining whether there is an object that the swing door 46 can hit using the first set of data and the second set of data. The method then includes the step of 1020 sending a stop power door signal (e.g., to power door actuation system 720) in response to a determination of an object that the swing door 46 can hit. The method also includes the step of 1022 transitioning back to the step of 1000 initiating the ultrasonic transducer burst pattern using the pair of ultrasonic transducers 114 including the first ultrasonic transducer 114 and the second ultrasonic transducer 114 in response to a determination of there not being an object that the swing door 46 can hit.

Clearly, changes may be made to what is described and illustrated herein without, however, departing from the scope defined in the accompanying claims. The non-contact obstacle detection system may operate with myriad combinations of various types of non-contact sensors and for any closure members of the motor vehicle, for example. In general, the non-contact obstacle detection system may be used also for other purposes, within the motor vehicle, or for different automotive applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A non-contact obstacle detection system for a motor vehicle comprising:
    a main electronic control unit having a plurality of input-output terminals and adapted to connect to a power source;
    at least one non-contact obstacle sensor coupled to said plurality of input-output terminals of said main electronic control unit for detecting obstacles near at least one closure member of the motor vehicle including a front door;
    a power actuator coupled to the at least one closure member and to said plurality of input-output terminals of said main electronic control unit for moving the at least one closure member; and
    said at least one non-contact obstacle sensor including at least one side view mirror proximity sensor disposed on a side view mirror of the front door,
    wherein said main electronic control unit is configured to move the at least one closure member using said power actuator, detect an obstacle using said at least one non-contact obstacle sensor, detect the obstacle using short range detection with said at least one side view mirror proximity sensor in response a determination that a rear door of the vehicle is in an open position, detect the obstacle using long range detection with said at least one side view mirror proximity sensor in response to a determination that the rear door is not in the open position, and cease movement of the at least one closure member in response to the obstacle being detected.

2. The non-contact obstacle detection system of claim 1, wherein said main electronic control unit is further configured to release a latch and apply power to a motor in response to the obstacle not being detected.

3. The non-contact obstacle detection system of claim 1, further including at least one of an angle sensor and a Hall-effect sensor, and wherein said main electronic control unit is further configured to determine whether the at least one closure member is in a full open position, and continue to apply power to a motor coupled to the at least one closure member in response to a determination that the at least one closure member is not in the full open position.

4. The non-contact obstacle detection system of claim 1, wherein the at least one closure member includes a lift gate and said at least one non-contact obstacle sensor includes at least one lift gate proximity sensor for detecting obstacles and gestures near the lift gate.

5. The non-contact obstacle detection system of claim 1, wherein said at least one non-contact obstacle sensor includes at least one door handle proximity sensor for attachment to a handle of a swing door for detecting obstacles near said handle and the swing door.

6. The non-contact obstacle detection system of claim 1, wherein said at least one side mirror proximity sensor is configured to detect obstacles near the side view mirror and monitor blind spots of the vehicle during motion of the vehicle.

7. The non-contact obstacle detection system of claim 1, wherein the at least one closure member includes a swing door and said power actuator is secured within an internal cavity of the swing door and includes an electric motor driving a spindle drive mechanism having an extensible component that is pivotably coupled to a portion of a body of the vehicle.

8. The non-contact obstacle detection system of claim 1, wherein said at least one non-contact obstacle sensor includes at least one ultrasonic sensor or at least one radar sensor.

9. The non-contact obstacle detection system of claim 1, further including a sensor multiplexer hub having a hub $I^2C$ repeater for communicating with said at least one non-contact obstacle sensor and which is coupled to at least one of said plurality of input-output terminals of said main electronic control unit for providing power to the sensor multiplexer hub and for communication with said main electronic control unit.

10. The non-contact obstacle detection system of claim 1, further including an LCD unit coupled to at least one of said plurality of input-output terminals of said main electronic control unit for displaying information related to said non-contact obstacle detection system to a user.

11. The non-contact obstacle detection system of claim 1, further including an angle sensor coupled to the at least one closure member and at least one of said plurality of input-output terminals of said main electronic control unit for detecting the angle of the at least one closure member.

12. The non-contact obstacle detection system of claim 1, wherein the main electronic control unit is configured to ignore the at least one side view mirror proximity sensor of the front door in response to the front door being in the open position.

13. The non-contact obstacle detection system of claim 1, wherein the main electronic control unit is configured to detect the obstacle with the side view mirror proximity sensor projected backward to provide coverage to the rear door, and another of said at least one side view mirror proximity sensor to provide coverage for the front door during opening.

14. The non-contact obstacle detection system of claim 1, wherein said at least one non-contact obstacle sensor includes a non-contact obstacle sensor disposed in a rocker panel of the vehicle and configured to detect objects in the path of the at least one closure member while the at least one closure member is moving.

15. The non-contact obstacle detection system of claim 1, wherein said at least one non-contact obstacle sensor includes a non-contact obstacle sensor disposed along a lower inner edge of a front swing door to detect objects in a path of one of the front door while closing and the rear door while opening.

16. The non-contact obstacle detection system of claim 1, wherein said at least one non-contact obstacle sensor includes at least one applique proximity sensor for attachment to a swing door for detecting obstacles and gestures near said applique and the swing door.

17. A method of operating a non-contact obstacle detection system for a motor vehicle comprising the steps of:
   determining whether at least one closure member including a front door of the motor vehicle is in an open position in response to detecting a command signal using a main electronic control unit;
   commanding the at least one closure member to move from a full closed position to a full open position in response to a determination that the at least one closure member is not in the open position;
   commanding the at least one closure member to move from the open position to the full closed position in response to a determination that the at least one closure member is in the open position;
   determining whether an obstacle is detected using at least one sensor including at least one side view mirror proximity sensor disposed on a side view mirror of the front door;
   detecting the obstacle using short range detection with the at least one side view mirror proximity sensor in response a determination that a rear door of the vehicle is in the open position;
   detecting the obstacle using long range detection with the at least one side view mirror proximity sensor in response to a determination that the rear door is not in the open position;
   continuing to move the at least one closure member in response to the obstacle not being detected;
   determining whether the at least one closure member is in the open position;
   returning to the step of determining if an obstacle is detected using at least one sensor in response to the at least one closure member being in the open position; and
   stopping motion of the at least one closure member in response to the at least one closure member not being in the open position.

18. A method as set forth in claim 17, wherein the at least one sensor includes a plurality of proximity sensors, and the step of determining whether an obstacle is detected using at least one sensor includes:
   activating a scan of a plurality of proximity signals from a plurality of proximity modules;
   generating a plurality of proximity sensor profiles based on the plurality of proximity signals;
   comparing the plurality of proximity sensor profiles to a plurality of stored recorded profiles; and
   determining whether a difference between a distance measured during motion of the at least one closure member and a stored distance value exceeds a threshold.

19. A method as set forth in claim 18, further including the steps of:
   returning to the step of generating a plurality of proximity sensor profiles based on the plurality of proximity signals in response to a determination that the at least one closure member is in the open position; and
   registering that the at least one closure member is closed and the next command signal will cause the at least one closure member to move in an opening direction in response to a determination that the at least one closure member is not in the open position;
   wherein the step of stopping motion of the at least one closure member in response to the at least one closure member not being in the open position includes:
   stopping motion of the at least one closure member; and
   registering that the next command signal will cause the at least one closure member to move in the opening direction in response to a determination that the difference between the distance measured during motion of the at least one closure member and the stored distance value exceeds the threshold.

20. A method as set forth in claim 17, further including the step of ignoring the at least one side view mirror proximity sensor of the front door in response to the front door being in the open position.

21. A method as set forth in claim 17, wherein the step of commanding the at least one closure member to move from a full closed position to a full open position in response to a determination that the at least one closure member is not in the open position includes releasing a latch and applying power to a motor coupled to the at least one closure member.

22. A method as set forth in claim 17, further including the steps of:
   maintaining the main electronic control unit in a stand-by state;
   periodically scanning for a command signal using the main electronic control unit in the stand-by state; and
   returning to the stand-by state in response to not detecting the command signal.

23. A method of operating a non-contact obstacle detection system for a motor vehicle comprising the steps of:
   determining whether a closure member is in an open position in response to detecting a command signal using a main electronic control unit;
   commanding the closure member to move from a full closed position to a full open position in response to a determination that the closure member is not in the open position;
   commanding the closure member to move from the open position to the full closed position in response to a determination that the closure member is in the open position;
   determining whether an obstacle is detected using at least one sensor, wherein the at least one sensor includes a pair of ultrasonic transducers including a first ultrasonic transducer and a second ultrasonic transducer;
   continuing to move the closure member in response to the obstacle not being detected;
   determining whether the closure member is in the open position;
   returning to the step of determining if an obstacle is detected using at least one sensor in response to the closure member being in the open position; and
   stopping motion of the closure member,
   wherein the step of determining whether an obstacle is detected using at least one sensor includes:
   bursting the first ultrasonic transducer;
   determining whether a first predetermined period of time has elapsed after bursting the first ultrasonic transducer;

waiting in response to a determination that the first predetermined period of time has not elapsed after bursting the first ultrasonic transducer;

bursting the second ultrasonic transducer in response to a determination that the first predetermined period of time has elapsed after bursting the first ultrasonic transducer;

receiving a first set of data from the first ultrasonic transducer after bursting the second ultrasonic transducer;

determining whether a second predetermined period of time has elapsed after bursting the second ultrasonic transducer;

waiting in response to a determination that the second predetermined period of time has not elapsed after bursting the second ultrasonic transducer;

receiving a second set of data from the second ultrasonic transducer after waiting in response to a determination that the second predetermined period of time has not elapsed after bursting the second ultrasonic transducer; and determining whether there is an object that the closure member can hit using the first set of data and the second set of data.

24. A method as set forth in claim 23, wherein the step of stopping motion of the closure member in response to the closure member not being in the open position can include the steps of:

sending a stop power door signal in response to a determination of an object that the closure member can hit; and transitioning back to the step of initiating the ultrasonic transducer burst pattern using the pair of ultrasonic transducers including the first ultrasonic transducer and the second ultrasonic transducer in response to a determination of there not being an object that the closure member can hit.

* * * * *